United States Patent
Goggin et al.

(10) Patent No.: US 9,262,189 B2
(45) Date of Patent: *Feb. 16, 2016

(54) CONFIGURING VM AND IO STORAGE ADAPTER VF FOR VIRTUAL TARGET ADDRESSING DURING DIRECT DATA ACCESS

(71) Applicant: VMware, Inc., Palo Alto, CA (US)

(72) Inventors: Edward J. Goggin, Concord, MA (US); Hariharan Subramanian, Wakefield, MA (US); Sanjana Aswani, Boston, MA (US)

(73) Assignee: VMware, Inc., Palo Alto, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 13/909,848

(22) Filed: Jun. 4, 2013

(65) Prior Publication Data

US 2014/0019969 A1 Jan. 16, 2014

Related U.S. Application Data

(63) Continuation of application No. 12/689,162, filed on Jan. 18, 2010, now Pat. No. 8,473,947.

(51) Int. Cl.
| | |
|---|---|
| *G06F 9/455* | (2006.01) |
| *G06F 9/46* | (2006.01) |
| *G06F 3/06* | (2006.01) |

(52) U.S. Cl.
CPC ............ *G06F 9/45533* (2013.01); *G06F 3/061* (2013.01); *G06F 3/0665* (2013.01); *G06F 3/0683* (2013.01); *G06F 9/45558* (2013.01); *G06F 3/0622* (2013.01); *G06F 2009/45579* (2013.01)

(58) Field of Classification Search
CPC ............ G06F 9/4555; G06F 9/52; G06F 9/46
USPC ............................................. 718/1, 104, 108
See application file for complete search history.

(56) References Cited

U.S. PATENT DOCUMENTS

| | | | | |
|---|---|---|---|---|
| 7,293,129 | B2 * | 11/2007 | Johnsen et al. | 710/313 |
| 7,548,975 | B2 * | 6/2009 | Kumar et al. | 709/226 |
| 2003/0131182 | A1 * | 7/2003 | Kumar et al. | 711/5 |
| 2006/0195618 | A1 * | 8/2006 | Arndt et al. | 710/1 |
| 2006/0239287 | A1 * | 10/2006 | Johnsen et al. | 370/412 |
| 2006/0242330 | A1 * | 10/2006 | Torudbakken et al. | 710/5 |

(Continued)

*Primary Examiner* — Jaweed A Abbaszadeh
*Assistant Examiner* — Phil Nguyen

(57) ABSTRACT

A method is provided for use in a system that includes a host computing machine configured to implement a virtualization intermediary and that includes a physical storage adapter, the configures a virtual machine (VM) and a virtual function (VF) to support IO operations to physical storage through a direct IOV path to the VF of the physical storage adapter, the method comprises: creating by the virtualization intermediary mapping information that includes a first mapping between virtual disks and physical regions of physical storage and that includes a second mapping between virtual disks and virtual disk addresses; transmitting the mapping information from the virtualization intermediary over the physical storage adapter from a physical function (PF) of the physical storage adapter to the VF; associating a virtual port with the mapping information within the virtualization intermediary; binding the virtual port to the VF; communicating virtual disk addresses indicated within the second mapping within the transmitted mapping information for the allocated virtual disks to the VM.

21 Claims, 10 Drawing Sheets

(56) References Cited

U.S. PATENT DOCUMENTS

| | | |
|---|---|---|
| 2008/0072223 A1* | 3/2008 | Cowperthwaite et al. ........ 718/1 |
| 2009/0019208 A1* | 1/2009 | Sanvido et al. .................. 711/2 |
| 2009/0064163 A1* | 3/2009 | Boyd et al. .................... 718/104 |
| 2009/0307378 A1* | 12/2009 | Allen et al. ....................... 710/4 |
| 2010/0058026 A1* | 3/2010 | Heil et al. ..................... 711/207 |
| 2011/0153715 A1* | 6/2011 | Oshins et al. ................. 709/203 |
| 2012/0072906 A1* | 3/2012 | Tsirkin et al. .................... 718/1 |

* cited by examiner

CONFIGURING VM AND IO STORAGE ADAPTER VF FOR VIRTUAL TARGET ADDRESSING DURING DIRECT DATA ACCESS

CROSS REFERENCE TO RELATED APPLICATION

This application is a continuation of U.S. patent application Ser. No. 12/689,162 filed Jan. 18, 2010 entitled "Configuring VM and IO Storage Adapter VF for Virtual Target Addressing During Direct Data Access", which is related to that of commonly owned patent application Ser. No. 12/689,152, entitled, Virtual Target Addressing During Direct Data Access Via VF of IO Storage Adapter, filed on even day herewith.

BACKGROUND

A host computer system may run multiple virtual machines (VMs) that share common resources such as physical storage. Physical storage used by the VMs typically is emulated so as to present virtual storage resources to the VMs. A virtualization intermediary manages interaction between VMs and physical storage. Some prior virtualization intermediaries "trap" (intercept) virtual storage requests issued by individual VMs and redirect the requests from virtual targets to physical targets. Such earlier virtualization intermediary uses trap handlers during emulation to redirect IO commands to prevent storage access violations. However, this emulation can be expensive in terms of instructions processed. Overall performance may decline when many VMs seek to access physical storage at the same time. The many storage requests can result in data access delays due to the compute cycles required by the virtualization intermediary to trap and translate simultaneous data requests from many VMs.

One solution to this problem has been proposed in the Single Root Virtualization I/O and Sharing Specification, Revision 1.0, Sep. 11, 2007 (PCI-SIG SR-IOV) specification. The PCI-SIG SR-IOV specification, which proposes providing each of one or more VMs with direct access to physical storage through its own storage adapter instance as a designated virtual function (VF) running on a physical storage adapter so as to avoid the need for heavy intervention by the virtualization intermediary to gain access to physical storage.

Unfortunately, direct access that bypasses the virtualization intermediary can result in loss of virtualization intermediary resident storage IO features such as virtual disk based provisioning.

SUMMARY

In some embodiments, a method is provided to configure a virtual machine (VM) and a virtual function (VF) of a physical SR IOV storage adapter to support virtual target addressing during IO operations to physical storage via a direct (Input Output Virtual) IOV path to the VF of the physical storage adapter. The method is for use in a system that includes a host computing machine configured to implement a virtualization intermediary. In the course of the provisioning method, the host machine becomes configured to run the virtual machine. The virtualization intermediary creates mapping information that includes a first mapping between virtual disks and physical regions of physical storage and that includes a second mapping between virtual disks and virtual disk addresses. A copy of the mapping information for virtual disks allocated to the virtual machine is transmitted over the physical storage adapter to the VF. The virtualization intermediary creates a virtual port, which is associated with the mapping information within the virtualization intermediary and which also is bound to the VF. Virtual disk addresses indicated within the second mapping within the mapping information for the allocated virtual disks are communicated to the VM.

The second mapping information permits SCSI transport level connections between the VM's virtual port and the VF based upon virtual SCSI transport addressing. The first mapping information allows a VM to access the physical storage of a virtual SCSI disk without intervention by a host-resident virtualization intermediary. Thus, the VM can use virtual SCSI transport addressing, and the virtualization intermediary need not intervene in the conversion of virtual addresses to physical addresses during ordinary runtime accesses by the VM to physical storage, since the mapping information to perform this conversion is resident on the VF.

DETAILED DESCRIPTION OF THE EMBODIMENTS

The following description is presented to enable any person skilled in the art to create and use a computer system configured for use with an IOV adapter in which a virtual logical unit can be used to access physical storage via a virtual function, and is provided in the context of particular uses and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

In this description, reference is sometimes made to a virtual machine, a hypervisor kernel, virtual machine monitors (VMMs), a virtualization intermediary or some other virtualized component taking some action. Persons skilled in the art will appreciate that a hypervisor kernel, VMMs and a virtualization intermediary comprise one or more software layers that run on a host system, which comprises hardware and software. In order to perform any given action, a virtual machine, virtualization intermediary or other virtualized component configures physical resources of the host machine to perform the given action. For example, a virtualization intermediary may configure one or more physical processors, according to machine readable program code stored in machine readable storage device, to re-assign physical processors allocated to I/O management.

Overview of Virtualization

Figure 1:
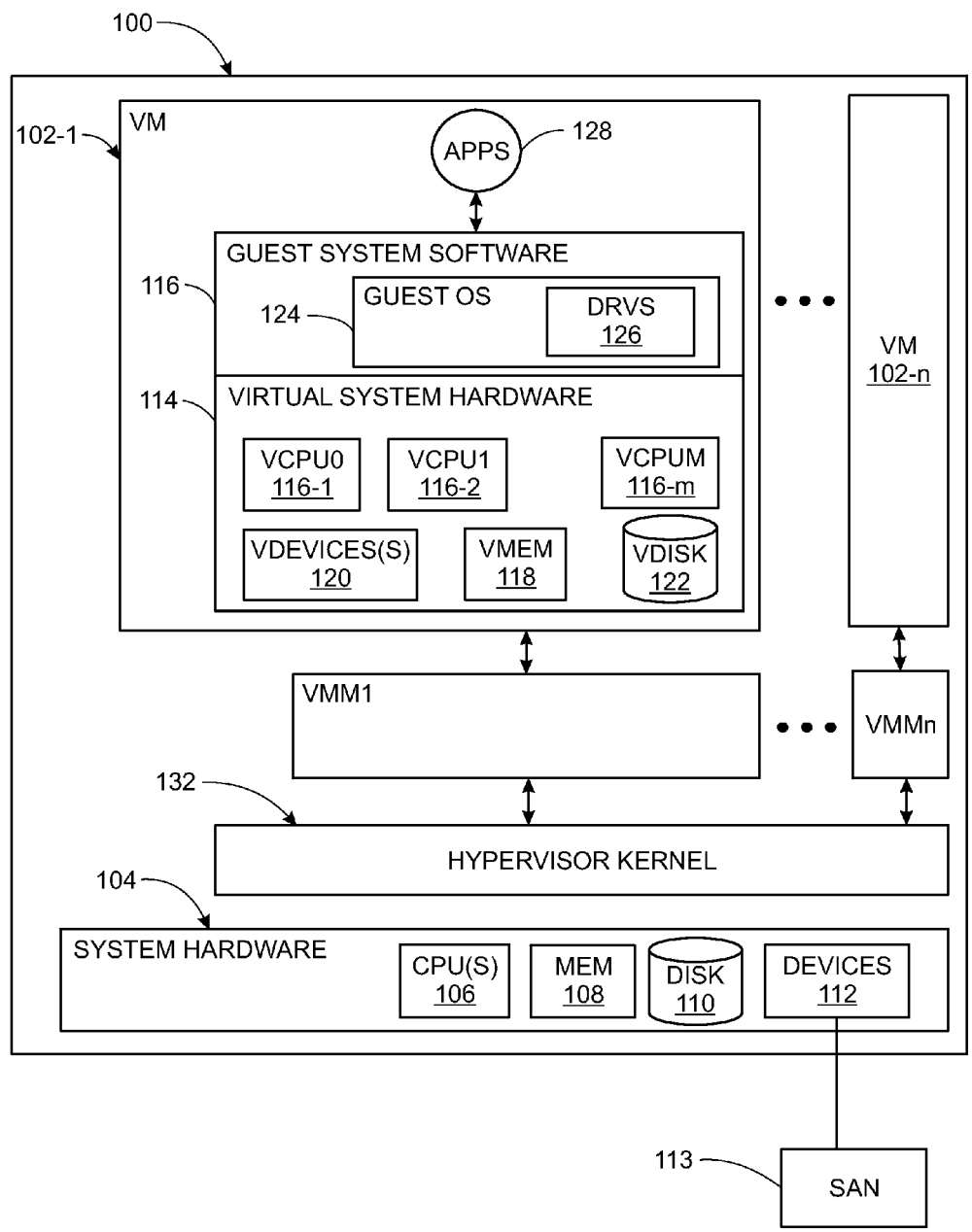
FIG. 1 is an illustrative drawing showing one possible arrangement of a computer system that implements virtualization.

FIG. 1 is an illustrative drawing showing one possible arrangement of a computer system 100 that implements virtualization. As is well known in the field of computer science, a virtual machine involves—a "virtualization"—in which an actual physical machine is configured to implement the behavior of the virtual machine. In the example system of FIG. 1, multiple virtual machines (VMs) or "guests" VM1 to VMn are installed on a "host platform," referred to as a "host," which includes system hardware, that is, hardware platform 104, and one or more layers or co-resident software components comprising a virtualization intermediary, e.g. a virtual machine monitor (VMM), hypervisor or some combination thereof. The system hardware typically includes one or more processors 106, memory 108, some form of mass storage 110, and various other devices 112, such as an IO storage adapter to perform protocol conversions required to access remote storage such as within a storage access network (SAN) 113 and to coordinate concurrent accesses to such storage.

Each virtual machine VM1 to VMn typically will have both virtual system hardware 114 and guest system software 116. The virtual system hardware typically includes one or more virtual CPUs (VCPUs) 116-1 to 116-$m$, virtual memory 118, at least one virtual disk 122, and one or more virtual devices 120. The virtual hardware components of the virtual machine may be implemented in software using known techniques to emulate the corresponding physical components. The guest system software includes guest operating system (OS) 124 and drivers 126 as needed for the various virtual devices 120. In many cases, software applications 128 running on a virtual machine VM1 will function as they would if run on a "real" computer, even though the applications are running at least partially indirectly, that is via guest OS 124 and virtual processor(s). Executable files will be accessed by the guest OS from virtual disk 122 or virtual memory 118, which will correspond to portions of an actual physical disk 110 or memory 108 allocated to that virtual machine.

A software component referred to herein as a 'virtualization intermediary' serves as an interface between the guest software within a virtual machine and the various hardware components and devices in the underlying hardware platform. The virtualization intermediary may include VMMs, hypervisor (also referred to as a virtualization "kernel") or some combination thereof. Because virtualization terminology has evolved over time and has not yet become fully standardized, these three terms do not always provide clear distinctions between the software layers and components to which they refer. In some systems, some virtualization code is included in at least one "superior" virtual machine to facilitate the operations of other virtual machines. Furthermore, specific software support for virtual machines may be included in the host OS itself. For example, the term 'hypervisor' often is used to describe both a VMM and a kernel together, either as separate but cooperating components or with one or more VMMs incorporated wholly or partially into the hypervisor itself to serve as a virtualization intermediary. However, the term hypervisor also is sometimes used instead to mean some variant of a VMM alone, which interfaces with some other software layer(s) or component(s) to support the virtualization.

One use of the term hypervisor signifies a software layer implemented to manage physical resources, process creation, I/O stacks, and device drivers. Under such an implementation, the hypervisor 132 would manage the selections of physical devices and their temporary assignment to virtual devices. For example, the hypervisor 132 would manage the mapping between VM1-VMn and their VCPUs 116-1 to 116-$m$, virtual memory 118, and the physical hardware devices that are selected to implement these virtual devices. More particularly, when a virtual processor is dispatched by a VM, a physical processor, such as one of the physical processors 104, would be scheduled by the hypervisor 132 to perform the operations of that virtual processor. In contrast, in the context of such implementation, VMM1-VMMn might be responsible for actually executing commands on physical CPUs, performing binary translation (BT) or programming of virtual hardware, for example. Note that the VMM is 'instanced' meaning that a separate instance of the VMM is created for each VM. Thus, although in this example, such a hypervisor and a VMM may be distinct, they would work together as a virtualization intermediary. Unless otherwise indicated, the term 'virtualization intermediary' encompasses any combination of VMM and hypervisor (or hypervisor kernel) that provides a virtualization layer between a guest OS running on VMs and the host hardware.

In the system of FIG. 1, the virtual machine monitors VMM1 to VMMn are shown as separate entities from the hypervisor kernel software 132 that run within VM1 to VMn, respectively. The VMMs of the system of FIG. 1 emulate virtual system hardware. While the hypervisor 132 is shown as a software layer located logically between all VMs and the underlying hardware platform and/or system-level host software, it would be possible to implement at least part of the hypervisor layer in specialized hardware. The illustrated embodiments are given only for the sake of simplicity and clarity and by way of illustration since as mentioned above, the distinctions are not always so clear-cut. Again, unless otherwise indicated or apparent from the description, it is to be assumed that one or more components of the virtualization intermediary can be implemented anywhere within the overall structure of such virtualization intermediary, and may even be implemented in part with specific hardware support for virtualization.

The various virtualized hardware components of the VM1, such as VCPU(s) 116-1 to 116-$m$, virtual memory 118, virtual disk 122, and virtual device(s) 120, are shown as being emulated within VMM1, which runs within virtual machine VM1. One advantage of such an arrangement is that the virtual machine monitors VMM1 to VMMn may be set up to expose "generic" devices, which facilitate VM migration and hardware platform-independence. For example, the VMM1 may be set up to emulate a standard Small Computer System Interface (SCSI) disk, so that the virtual disk 122 appears to the VM1 to be a conventional SCSI disk connected to a conventional SCSI adapter, whereas the underlying, actual, physical disk 110 may be something else. The term "disk" typically signifies persistently stored data addressed in sequence, typically from address zero to address max capacity-1. In that case, a conventional SCSI driver typically would be installed into the guest OS 124 as one of the drivers 126. A virtual device 120 within the VMM then would provide an interface between VM1 and a physical driver 126 that is part of the host system and would handle disk operations for the VM1.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest OS other than those that would be found in a non-virtualized computer; thus, the guest OS 124 could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, some para-virtualized systems include an interface within the guest that enables explicit calls to other components of the virtualization software.

For some, the term para-virtualization implies that the guest OS (in particular, its kernel) is specifically designed to support such an interface. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration. In a hosted virtualized computer system, an existing, general-purpose operating system forms a "host" OS that is used to perform certain input/output (I/O) operations, alongside and sometimes at the request of the VMM.

The system of FIG. 1 is an example of a non-hosted configuration in which VMMs are deployed on top of a software layer—hypervisor kernel 132—constructed specifically to provide support for the virtual machines. Kernel 132 also may handle any other applications running on it that can be separately scheduled, as well as a console operating system that, in some architectures, is used to boot the system and facilitate certain user interactions with the virtualization software.

PCI SR-IOV

Many modern computing devices employ input/output (IO) adapters and buses that utilize some version or implementation of the Peripheral Component Interconnect (PCI) standard, which specifies a computer bus for attaching peripheral devices to a computer motherboard. PCI Express (PCIe) is an implementation of the PCI computer bus that uses existing PCI programming concepts, but bases the computer bus on a different and much faster serial physical-layer communications protocol. In addition to the PCI and PCIe specifications, the PCI-SIG has defined input/output virtualization (IOV) standards for defining how to design an IO adapter that can be shared by several virtual machines.

The term "function" is used in the PCI context to signify a device with access controlled by a PCI bus. A PCI function is identified within a single PCI root complex by its PCI or PCIe bus, device, and slot identifiers. A PCI function includes a configuration space, which includes both device dependent and device independent regions used by host software to support device relocation on the PCI bus, flexible device-to-interrupt binding, device identification, and device configuration. A function also includes memory space which is identified by Barrier Address Registers in configuration space and provides a memory mapped I/O interface for host I/O initiated from host to the device. A PCIe function also includes message space which is identified by Message Signaled Interrupt (MSI) and Message Signaled Interrupt-Extended (MSI-X) capabilities in configuration space and provides either or both MSI/MSI-X message based interrupt generation. Many network (e.g., Ethernet) and storage (e.g., disk) adapters are implemented as PCI or PCIe compliant adapters and are recognized by a machine's PCI sub-system as a single PCI function. Multi-port PCI or PCIe adapters simply appear to a host PCI sub-system as multiple PCI functions.

Figure 2:
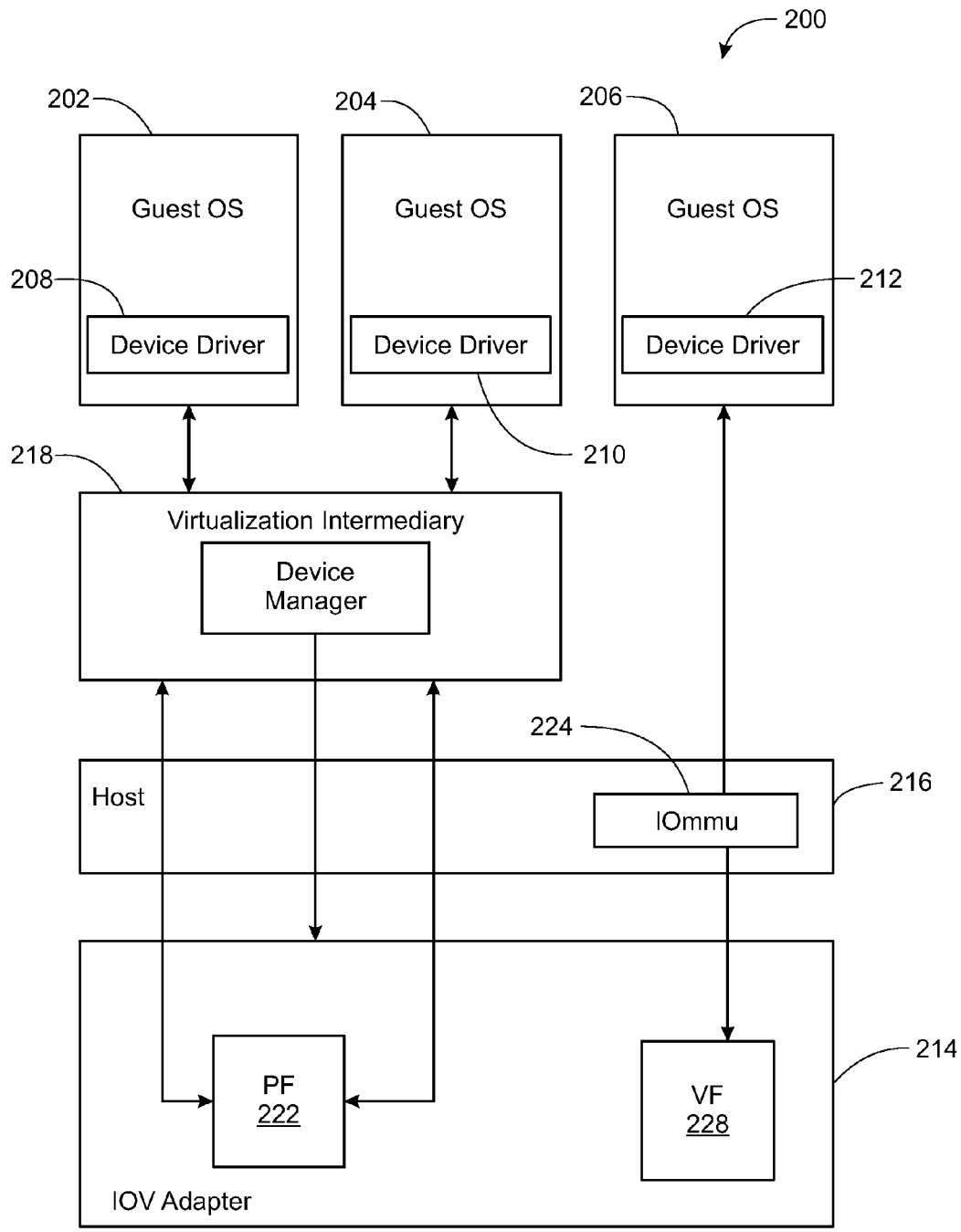
FIG. 2 is an illustrative drawing of a virtualized system including SR-IOV virtualization.

FIG. 2 is an illustrative drawing of a virtualized system 200 including SR-IOV virtualization. Techniques specified in the PCI-SIG SR-IOV specification can be used to reduce the CPU impact of high throughput workloads by bypassing the virtualization intermediary. The term 'single root' refers to a single root complex as contrasted with a multiple root complex. In a PCI Express system, a root complex device couples the processor and memory subsystem to a PCI Express switch fabric comprised of one or more switch devices. The root complex generates transaction requests on behalf of the processor, which is interconnected through a local bus.

The illustrative system includes VMs 202-206, each independently running a separate (and possibly different) guest operating system. A virtualization intermediary layer 218 runs between the virtual machines 202-206 and a host machine 216. Device driver 208 of VM 202 and device driver 210 of VM 204 each drive a physical function (PF) 222, with intervention by the virtualization intermediary 218. Device driver 212 of VM 206 drives the virtual function (VF) 228, without intervention by the virtualization intermediary 218. The device driver 212 communicates with I/O MMU logic 224 disposed on the host machine 216 in the course of accessing data with mass storage (not shown). A device manager 220 within virtualization intermediary 218 manages the allocation and de-allocation of VFs for the IOV adapter 214. The IOV adapter 214 provides a memory-mapped input/output interface for IO and provides an interface for controlling VFs.

A typical IOV adapter includes processor, memory and network interface resources (not shown) to implement the PF and one or more virtual functions VFs. A PF is a PCIe function that supports the SR-IOV capabilities defined in the PCI SR-IOV specification. A PF is used to control the physical services of the device and to manage individual VFs.

A VF is a PCIe function which is associated with a particular physical function and shares physical PCI adapter resources (e.g., ports, memory) with that physical function and other virtual functions located on the same physical adapter. A virtual function has its own PCI configuration space, memory space, and message space separate from other physical or virtual functions on that same adapter. A physical function, such as PF 222 in this example that is associated with a virtual function 228 is responsible for allocating, resetting, and de-allocating that virtual function and the PCI resources required by that virtual function. In general, a VF can either be accessed via a virtualization intermediary or bypass the virtualization intermediary to be directly accessed by a guest OS. In the example system 200, VMs 202, 204 respectively access PF 222 via the virtualization intermediary 218, and VM 206 accesses VF 214 directly, i.e. without the virtualization intermediary 218. Thus, a VF can, without runtime intervention by a virtualization intermediary, directly be a sink for I/O and memory operations from a VM, and be a source of Direct Memory Access (DMA), completion, and interrupt operations to a VM.

SCSI Command Protocol

The International Technology Standards (INCITS) T10 Technical Committee has adopted a layered approach that divides the Small Computer System Interface (SCSI) into multiple layers of standards. The lowest layer refers to physical interfaces sometimes referred to as physical transports. The next layer up pertains to transport protocols usually directly associated with one physical transport standard. The top layer consists of command sets associated with specific devices such as disk drives or tape drives, for example. See, J. Lohmeyer, SCSI Standards Architecture, Business Briefing: Data Management & Storage Technology 2003. A result of this layered approach to the SCSI standard is that there are over 30 SCSI standards. In general, only a few of these standards apply to a given product. As used herein, the term 'SCSI' signifies compliance with one or more of these SCSI standards.

A SCSI command is a request describing a unit of work to be performed by a device server. A SCSI command descriptor block (CDB) is a structure used to communicate commands from an application client to a device server. The SCSI command set assumes an underlying request-response protocol. The fundamental properties of the request-response protocol are defined in SCSI Architecture Model (SAM)-3, Revision 14. Action on SCSI commands is not be deemed completed until a response is received. The response ordinarily includes a status that indicates the final disposition of the command. See, SCSI Primary Commands—3 (SPC-3), Revision 23, Section 4.2, The request-response model, May 4, 2005, American National Standards for Information Systems—InterNational Committee for Information Technology Standards. (hereinafter "SPC-3, Revision 23")

A SCSI device is a device that contains one or more SCSI ports that are connected to a service delivery subsystem and supports a SCSI application protocol. An application client is an object that is the source of SCSI commands. A SCSI initiator device is a SCSI device that contains application clients and SCSI initiator ports that originate device service and task management requests to be processed by a SCSI target device and receive device service and task management responses from SCSI target devices. A SCSI initiator port is a SCSI initiator device object that acts as the connection between application clients and the service delivery subsystem through which requests and responses are routed. A SCSI target device is a SCSI device containing logical units and SCSI target ports that receive device service and task management requests for processing and sends device service and task management responses to SCSI initiator devices. A SCSI target port is a SCSI target device object that acts as the connection between device servers and task managers and the service delivery subsystem through which requests and responses are routed. A logical unit is an externally addressable entity within a SCSI target device that implements a SCSI device model and contains a device server. See, SPC-3, Section 3.1 Definitions.

For the purpose of the following description, it is assumed that the IO storage adapter described herein employs a port based SCSI transport protocol, such as Fiber Channel, iSCSI or SAS, to transfer of data between a host system IO bus and SCSI storage. In accordance with the iSCSI transport protocol, for example, a SCSI initiator is responsible for packaging a SCSI CDB perhaps with the aid of a machine's operating system and sending the CDB over an IP network. An iSCSI target receives the CDB and sends it to an iSCSI logical unit, which may be a disk, CD-ROM, tape drive, printer, scanner or any type of device, managed by a SCSI target. The SCSI target sends back a response to the CDB that include a status that indicates the final disposition of the command.

A SCSI target may manage numerous SCSI logical units. In some embodiments, a SCSI target identifier in combination with a SCSI LUN (logical unit number) and a Logical Block Address (LBA) constitutes a storage address. A separate parameter indicates the size of the storage region located at the specified storage address in terms of the number of contiguous blocks associated with the address. A SCSI LUN, serves as an instance identifier for a SCSI logical unit that uniquely identifies a SCSI logical unit within the scope of a given SCSI target at a given time. A SCSI LBA is the value used to reference a logical block within a SCSI logical unit.

Multiple SCSI commands can be issued concurrently i.e. a host system can issue a new SCSI Command before a prior SCSI Command completes. Moreover, as will be explained more fully below, one "virtual" SCSI command to access a (virtual SCSI target, virtual SCSI logical unit) combination can result in multiple "physical" SCSI commands to one or more physical SCSI logical units of one or more physical SCSI targets in which case a VF servicing the one virtual SCSI command must wait until all of the multiple SCSI commands to the multiple physical SCSI target, physical SCSI logical unit combinations have completed before 'completing' the virtual SCSI command.

IOV with Virtual Storage on Fast Access Data Path

Figure 3:
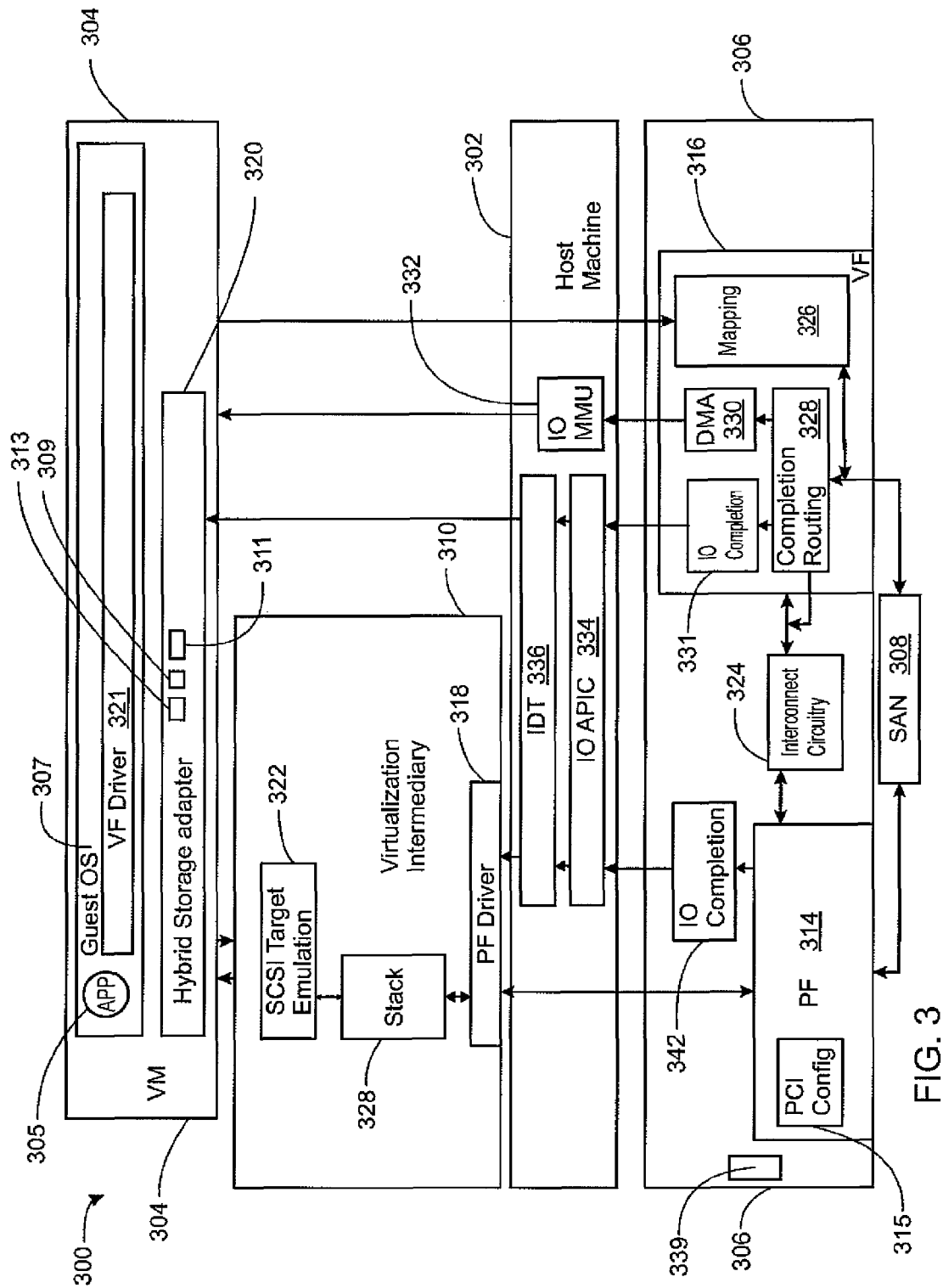
FIG. 3 is an illustrative drawing of a system that includes a host machine that hosts a virtualization intermediary and a virtual machine and that is coupled to access physical storage through an IOV adapter.

FIG. 3 is an illustrative drawing of a system 300 that includes a host machine 302 that hosts a virtual machine 304 and that is coupled to a storage adapter 306 that adapts IO communications over a PCI bus protocol of the host machine 302 to SCSI storage access protocols used to access persistent physical storage 308. The system 300 of FIG. 3 is an implementation that in general possesses much the same general type of configuration and component structures explained with reference to FIG. 1 except that VM 304 is configured for direct-access to physical storage via the IOV storage adapter 306 in accordance with the PCI SR-IOV specification. However, details are omitted from FIG. 3 so as to not obscure IOV features.

In some embodiments the PCI bus protocol is compliant with both the PCI (Peripheral Component Interconnect) Express specification and the PCIe SR-IOV extension specification, and SCSI commands are used with one or more SCSI transport protocols such as iSCSI, SAS or Fibre Channel to directly communicate IO access requests (Read/Write) with persistent physical storage 308 such as SAN storage, for example. More particularly, a storage adapter 306 allows a virtual machine 304 to access physical storage 308 via IOV direct access for certain SCSI Read/Write CDBs and allows access via a virtualization intermediary 310 for other SCSI CDBs. Accordingly, certain frequently occurring Read and Write SCSI commands are directed over a fast IOV data path coupling between the virtual machine 304 and a virtual function 316 substantially without involvement of the virtualization intermediary 310. However, certain error conditions, such as recoverable error conditions, are directed to the virtualization intermediary 310 to resolve more complex conditions that require more elaborate processing.

The storage adapter 306 includes adapter resources 339 such as processor and memory resources and network protocol translation and interface resources, which will be readily understood by persons skilled in the art, to implement a physical function (PF) 314 and the virtual function (VF) 316. In the illustrated embodiment, the VF 316 is associated with virtual machine 304. A PF driver 318 communicates information between the PF 314 and the virtualization intermediary 310. A VF driver 321 communicates information with both the VF 316 and a hybrid storage adapter (HSA) 320 instantiated within the virtual machine 304. Although only one VM 304 and one corresponding VF 316 are shown and described herein, it will be appreciated that the host system 302 may host multiple VMs and the adapter 306 may implement multiple corresponding VFs, and the description herein would apply to each such combination of VM and VF. Multiple VFs (only one shown) may be instantiated within the adapter 306, and that each respective virtual machine (only one shown) may be associated with a different respective VF to create respective IOV data paths for certain frequently occurring Read and Write SCSI commands.

The HSA 320 'appears' to be a physical PCI device (i.e. a storage adapter) from the perspective of the virtual machine 304. The HSA 320 acts as the virtual machine's interface to the physical storage world, i.e. to the physical storage adapter 306. The hybrid storage adapter comprises an emulated PCI storage adapter within the VM 304, which encapsulates a PCI SR-IOV virtual function of an SR-IOV compliant physical storage adapter presented by the virtualization intermediary 310 within a protected memory space of the virtual machine. A PCI configuration space 309 of the virtual function 316 is copied to the HSA's PCI configuration space, so as to provide a memory mapped interface to the first HSA PCI memory space 311 that supports direct access to physical storage 308. The HSA 320, through the first PCI memory space, provides a direct access path to the guest OS 307 of the virtual machine 304 with the capability to issue I/O directly to the physical adapter 306 without intervention by the virtualization intermediary 310. In addition, the HSA's PCI configuration space maps to the second HSA PCI memory mapped interface 313 that supports fully emulated access to physical storage 308 via the physical adapter 306 through the virtualization intermediary 310. Although the HSA 320 is shown resident within a protected memory space of the virtual machine 304, it will be appreciated that it could instead reside within the virtualization intermediary 310. The HSA 320 is referred to as a 'hybrid' adapter herein because it is not strictly a direct access adapter nor is it strictly an emulated adapter but instead is an adapter which provides both direct access and emulated I/O capabilities via its two memory mapped interfaces 311 and 313 respectively.

The VF driver 321 is savvy as to the hybrid nature of the HSA 320, and as such is a 'para-virtual' device driver. The VF driver 320 directs certain SCSI IO operations to the first HSA PCI memory space 311 for direct access to physical storage 308 via the VF. The VF driver 321 directs other SCSI operations to the second HSA PCI memory space 313 for fully emulated access to physical storage 308.

In some embodiments, the virtualization intermediary 310 is implemented as the 'ESX' hypervisor produced by VMware, Inc. having a place of business in Palo Alto, Calif. The ESX hypervisor serves as a virtualization intermediary having both VMM and hypervisor functionality. Each VM (e.g. virtual machine 304) runs on top of ESX. In an ESX environment, a portion of each VM comprises a VMM. That is, VMMs are embedded in the VM's address space, albeit in a protected region. In some embodiments, the hybrid storage adapter 320 also resides in a protected memory space of the VM, and more particularly, runs within the execution context of the VMM that is embedded in that VM's memory space. If a given VM has multiple VCPUs, then each VCPU has an associated VMM. In an ESX environment, the VMM/hypervisor virtualization intermediary serves as the primary memory management component to manage multiple simultaneously running VMs.

A SCSI target emulation module 322 within the virtualization intermediary 310 maps virtual SCSI logical units (i.e virtual disks) to physical SCSI targets and physical SCSI logical units located in storage 308. For each VM (only one shown) that has an associated VF (only one shown), mapping metadata provided by the SCSI target emulation module 322 is communicated to the associated VF 316 via the PF driver 318, PF 314 and interconnect circuitry 324 within the adapter 306. The VF 316, thereby is provided with the mapping information used to provide direct access to physical SCSI targets and physical SCSI logical units within physical storage 308 that have been allocated to the one or more virtual disks allocated to such virtual machine 304. Note that the interconnect circuitry 324 may be implemented in hardware or firmware, for example.

Provisioning and Instantiation of Virtualized Compute Resources for IOV

FIGS. 4A-4D are illustrative drawings that show a process to provision and instantiate the virtualized computer resources of the system 300 of FIG. 3. Dashed lines are used in these drawings to represent components that are in the process of being instantiated. Solid lines are used to represent components that already have been instantiated. Arrows represent flow of control or information. Certain components in FIGS. 4A-4D shown above the host 302 represent a virtual machine 304 and the virtualization intermediary 310 configuring the host machine 302 according to machine readable program code stored in machine readable storage device to perform specified functions of the components. Each of the drawings of FIGS. 4A-4D represents a different stage of the provisioning and instantiating of the virtualized computer resources for the system 300 of FIG. 3.

Figure 4A:
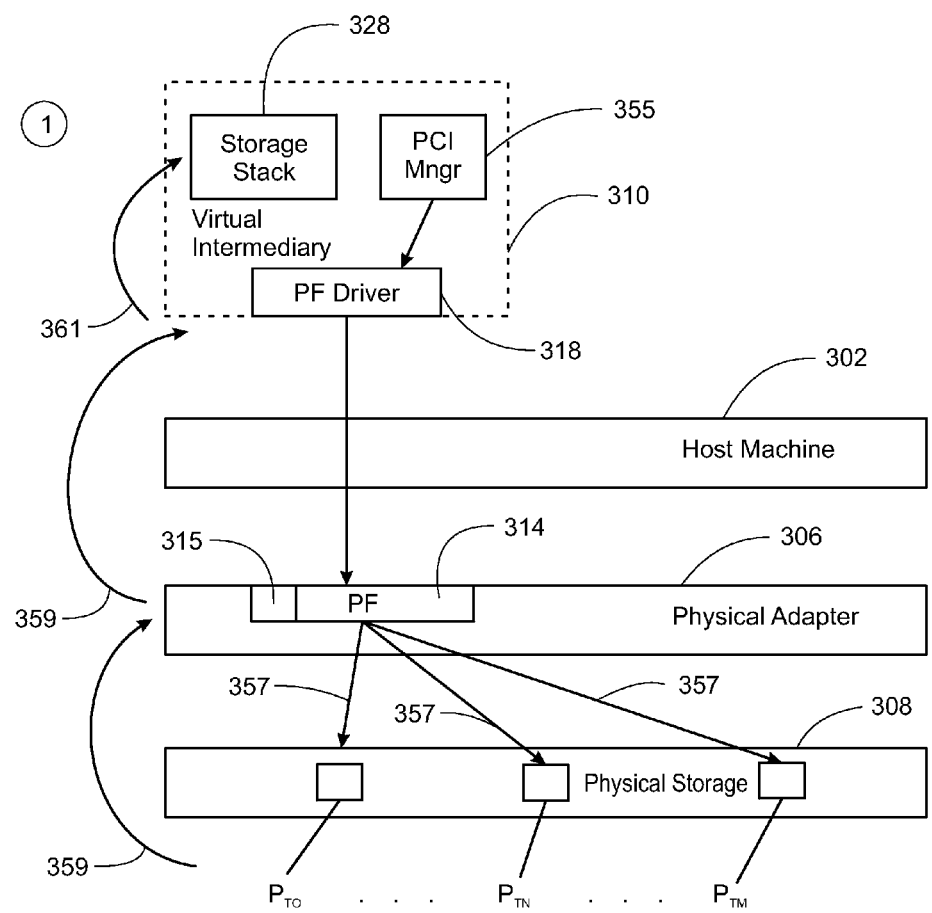
FIGS. 4A-4D are illustrative drawings that show a process to provision and instantiate the virtualized computer resources of the system of FIG. 3.

Referring to FIG. 4A, in the course of instantiating the virtualization intermediary 310, a known PCI manager routine 355 scans the PCI bus (not shown) of the host machine 302 and discovers the physical SR IOV hardware bus adapter (SR IOV adapter) 306 as a valid PCI device and invokes all registered PCI compliant drivers until one driver claims the SR IOV adapter 306. In this case, PF driver 318 claims the SR IOV adapter 306 and discovers a PCIe function of the discovered device to be a physical function (PF) 314, which is indicated by SR-IOV capabilities specified in the PF function's PCI configuration space 315.

After claiming the storage adapter's PF, the PF driver 318 obtains attribute information from the physical adapter 306 via the PF 314 such as the number of SCSI initiator ports and the speed of these ports. The PF driver 318 also discovers physical SCSI target ports and attempts to establish connections indicated by arrow 357 through the PF 314 with these using SCSI transport protocol dependent mechanisms, such as Fiber Channel, iSCSI and SAS, for example. Through these connections, the PF driver 318 learns of possible connections to physical SCSI targets represented by arrows 359. In this illustrative example, the PF driver 318 learns of physical targets $P_{T0}$ to $P_{TN}$ and $P_{TN}$ to $P_{TM}$ through these connections 359. The PF driver 318 passes identifying information, concerning the discovered physical SCSI targets up to storage stack 328, to higher level software in the virtualization intermediary 310 as represented by arrow 361.

Figure 4B:
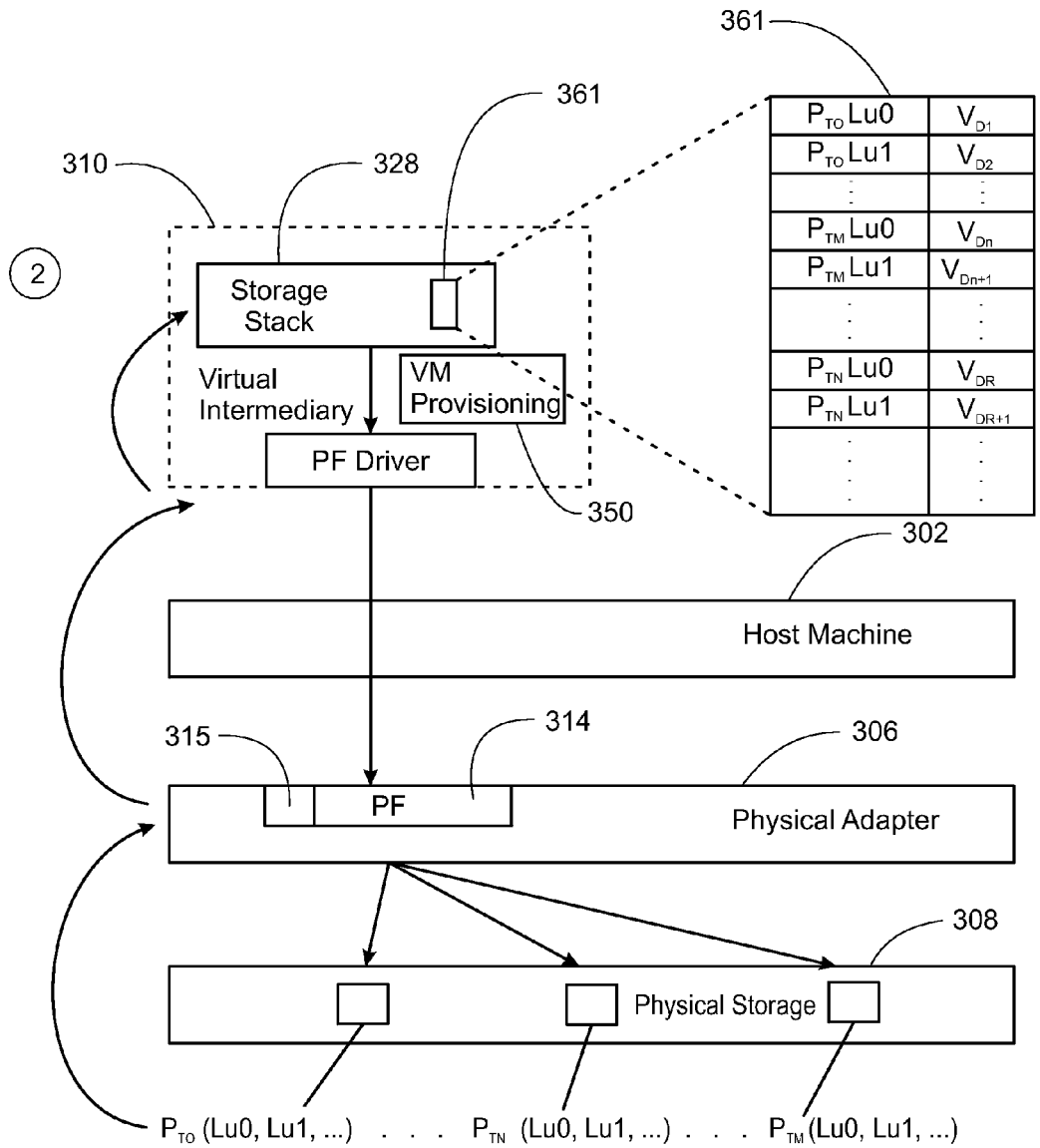

Referring to FIG. 4B, the storage stack 328 probes the SCSI bus via the PF driver 318 and PF 314 for paths associated with physical storage 308 by sending SCSI commands to all possible SCSI logical units on all discovered physical SCSI targets. In this example, the storage stack learns of physical SCSI logical units $P_{T0}$(LU0, LU1, ... ), $P_{TN}$ (LU0, LU1, ... ) to $P_{TM}$(LU0, LU1, ... ) In this manner, the storage stack 328 learns of redundant physical SCSI paths to reach all discovered physical SCSI logical units. A unique SCSI path can be defined in terms of a unique combination, a three-tuple, comprising (SCSI initiator identifier, SCSI target identifier, SCSI logical unit number). The discovery of redundant SCSI paths is used for multipath management within the storage stack component 328. During runtime, one role of the storage stack 328 is to handle physical SCSI transport connection errors; that is, to perform SCSI multipathing path failover.

Now that the virtualization intermediary 310 (i.e. storage stack 328) has learned of the physical storage resources, virtual storage resources are created, allocated and mapped to the physical storage resources. More particularly, a VM provisioning utility 350, which may be a part of the virtualization intermediary 310, creates virtual disks. In the illustrated example, virtual disks $V_{D1}$, $V_{D2}$, $V_{D3}$, . . . are created. As illustrated in FIG. 4B, the VM provisioning utility maps the newly created virtual disks to discovered physical logical units. In the illustrated example $V_{D1}$ is mapped to $P_{T0}$(LU0); $V_{D2}$ is mapped to $P_{T0}$(LU1); and $V_{Dn}$ is mapped to $P_{TM}$(LU0), etc. The virtual disk creation process typically also involves the creation of the file system 328-1 and a logical volume manager (not shown) to track allocated regions of physical storage of multiple physical SCSI logical units across multiple virtual disk files on that file system There need not be a one-to-one relationship between physical SCSI logical units and virtual disks. For example, the physical-to-virtual mapping may be as small as an addressable SCSI logical block. Generally, the SCSI logical block size is configurable. See, SCSI Block Commands-3 (SBC-3), Revision 15, Section 4.4 Logical Blocks, May 13, 2005, American National Standards for Information Systems—InterNational Committee for Information Technology Standards, (hereinafter "SBC-3, Revision 15").

More particularly, the VM provisioning utility 350, creates first mapping metadata 361 to indicate the correlation between virtual disks and corresponding regions of physical SCSI logical units. Each region of the physical storage is identified by both a unique storage address and a size. Each respective virtual disk may correspond to one or more such physical storage regions. The first mapping metadata 361 provides a mapping of individual virtual disks to one or more physical regions allocated to that virtual SCSI logical unit. The first mapping metadata 361 is persistently stored since one or more virtual machines to be provisioned with such virtual disks may not be instantiated until some time in the future.

Figure 4C:
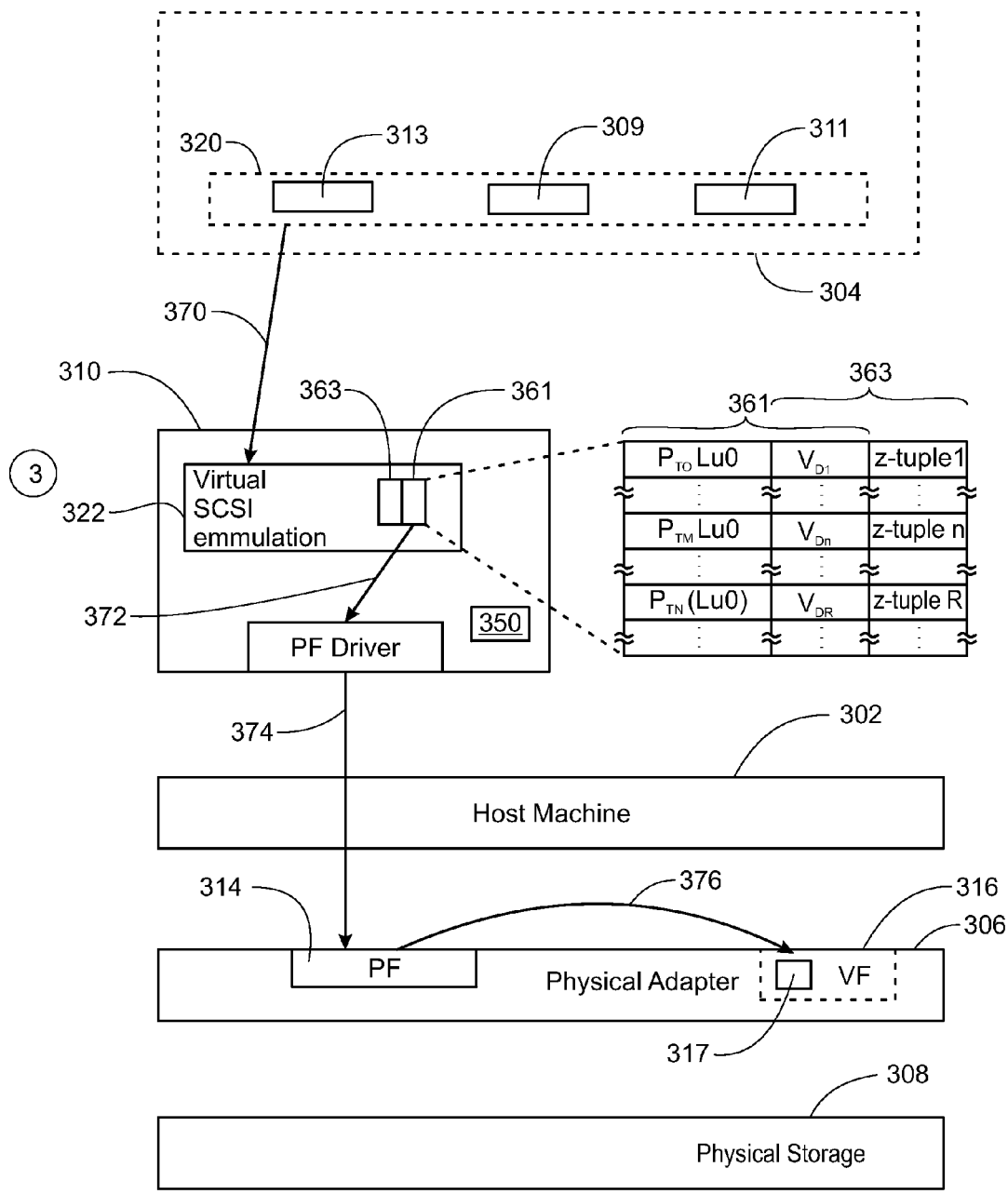

Referring now to FIG. 4C, in the course of instantiation of virtual compute resources for virtual machine 304, the virtualization intermediary 310 creates virtual hardware resources for the virtual machine 304 such as one or more virtual CPUs, virtualized memory, a virtualized PCI bus and one or more virtual PCI devices including a hybrid storage adapter (HSA) 320.

As part of the instantiation of the HSA 320, a VF 316, a virtual port (not shown), and an MSI or MSI-X interrupt vector (not shown) are allocated/reserved. The VF 316 is "bound" to both the virtual port and the interrupt vector. More specifically, the virtualization intermediary 310 creates (sets up) the virtual port, and the PF driver 318 is made aware of the association and the PF driver passes the binding of the virtual port and MSI/MSI-X interrupt vector to the VF 316 via the PF 314 and the interconnect circuitry.

In order to utilize existing SAN and SCSI target access control mechanisms (e.g., FC zoning and SCSI target based LUN masking) for authorization of I/O from different VMs each utilizing different VFs on the same physical storage adapter, I/O sent by a VF directly accessed by a virtual machine is associated with a virtual port assigned to that VF as opposed to the single physical port of the VF's physical adapter. To that end, during the resource provisioning phase, the above-mentioned virtual port is allocated and persistently associated with the VF 316.

A virtual port is assigned for each VF provisioned to a VM. In the realm of storage virtualization, there exists a notion of a virtual port that exists in software. A virtual port has a unique port address just as a physical port does. The virtualization intermediary 310 performs a series of logins to the fabric on behalf of the VM associated with the VF to which the virtual port is assigned, to authenticate the virtual port and to receive a transport address. As a result of the login operation, the virtual port is authenticated with the fabric, and has an established transport connection to a physical SCSI target. Thus, the VF associated with the virtual port serves as an initiator in a SCSI path triplet (virtual SCSI initiator, physical SCSI target, physical LUN).

During both resource provisioning and the runtime life of a virtual machine, physical SCSI storage utilized for virtual disks to be directly accessed by a given VF should be 'visible' from that VF's virtual port. The provisioning utility 350 communicates to the storage stack 328 the identity of the virtual port that is bound to the virtual function 316. A virtual port identifier is used by constituents of the virtualization intermediary 310 to associate physical storage resources with the VF 316 corresponding to such virtual port. The storage stack tracks SCSI paths separately for virtual SCSI initiator ports verses physical SCSI initiator ports. That and the provisioning of physical storage for use by the VF 316 and access to this storage at runtime by the VF must be via that virtual port.

The existence and identity of the virtual port is communicated from the PF to a VF, and the VF ensures that I/O that the VF 316 sends on the physical storage (e.g., SAN) 308 utilizes the SCSI transport address of the virtual port and not the adapter's physical port SCSI transport address.

During 'steady state' operation, described more fully below, the virtual port is used to exchange SCSI read/write communications via a SCSI transport level protocol (e.g. SAS, Fibre Channel or iSCSI) between the VF and regions of physical storage identified in terms of (physical targets, physical logical units). However, the virtual SCSI initiator within the HSA 320 and the virtual SCSI target within the VF 316 employ SCSI Parallel Interface (SPI) transport protocol, which is not port based, in their communications with each other. In the SPI protocol, the virtual SCSI initiator identifier and the virtual SCSI target identifier serve as connections for the SPI. Hence, the VF driver 321 has knowledge of the virtual SCSI target identifier associated with the VF 316. Hence, the virtual LUN information does not serve as SPI connection information.

Also, in the course of instantiating (i.e. creating) a new virtual machine 304, the provisioning utility 350, allocates one or more previously created virtual disks (i.e. virtual SCSI logical units) to such new virtual machine 304. Many, perhaps hundreds of virtual disks can be allocated to a given virtual machine 304. Each virtual disk that is allocated to the given virtual machine 304 is assigned a unique virtual address represented by second 363 mapping that includes a two-tuple comprising a virtual SCSI target, virtual SCSI LUN. In the example in FIG. 4C, virtual disk $V_{D3}$ is allocated to two-tuple1; $V_{D2}$ is allocated two-tuple2 and $V_{D3}$ is allocated two-tuple3.

The virtual address information representing the second mapping metadata 363 for each virtual disk is arrived at as follows. The virtualization intermediary 310 creates HSA 320 in the course of instantiating the virtual machine 304. The HSA 320 requests that a virtual SCSI target emulation module 322 within the virtualization intermediary 310 perform the following tasks related to the instantiation of compute resources of a virtual SCSI target emulation on the VF 314. The SCSI target emulation module 322 instantiates one or more virtual SCSI targets. For each virtual SCSI logical unit emulated by each virtual SCSI target, the virtual SCSI target emulation module 322 initializes SCSI logical unit attributes such as capacity/size, access control restrictions (e.g., read only), a virtual SCSI logical unit number (LUN) with which to associate the virtual SCSI logical unit with the SCSI target, and a logical extent map.

The logical extent map contains a series of logical extents, one logical extent for every portion of a virtual SCSI logical unit which is backed by a contiguous region of physical storage. Each logical extent consists of a SCSI logical block address within the virtual SCSI logical unit, a physical extent identifying the storage address of the exact location of the contiguous region of physical storage, and a length which indicates the size of the contiguous region of physical storage.

During the instantiation phase of the HSA 320, the HSA requests the creation of a virtual SCSI target within the virtual SCSI target emulation module 322 of the virtualization intermediary 310. The virtualization intermediary initiates the creation of a virtual SCSI target within the VF 316. As indicated by arrow 370, the HSA 320 requests to the virtual SCSI target emulation module 322 to forward a virtual target emulation mapping 317 comprising the first and second mapping metadata 361 and 363 to the VF 316 corresponding to the VM 304 that is being instantiated. It will be appreciated that the second mapping metadata 363 indicates the virtual target and virtual LUN information associated with each virtual disk allocated to VM 304. The module 322 sends the mapping 317 to the PF driver 318, as indicated by arrow 372. The PF driver 318 formats the mapping 317 as control I/O control blocks and sends them to the PF as indicated by arrow 374. The PF 314 forwards the mapping 317 to the VF 316 via interconnect circuitry of the physical adapter 306. During runtime, as explained in sections below, the VF 316 uses mapping 317 to map virtual SCSI logical units (virtual disks) allocated to the virtual machine 304 to possibly multiple disparate regions across possibly multiple physical SCSI logical units each possibly accessible via different physical SCSI targets.

Figure 4D:
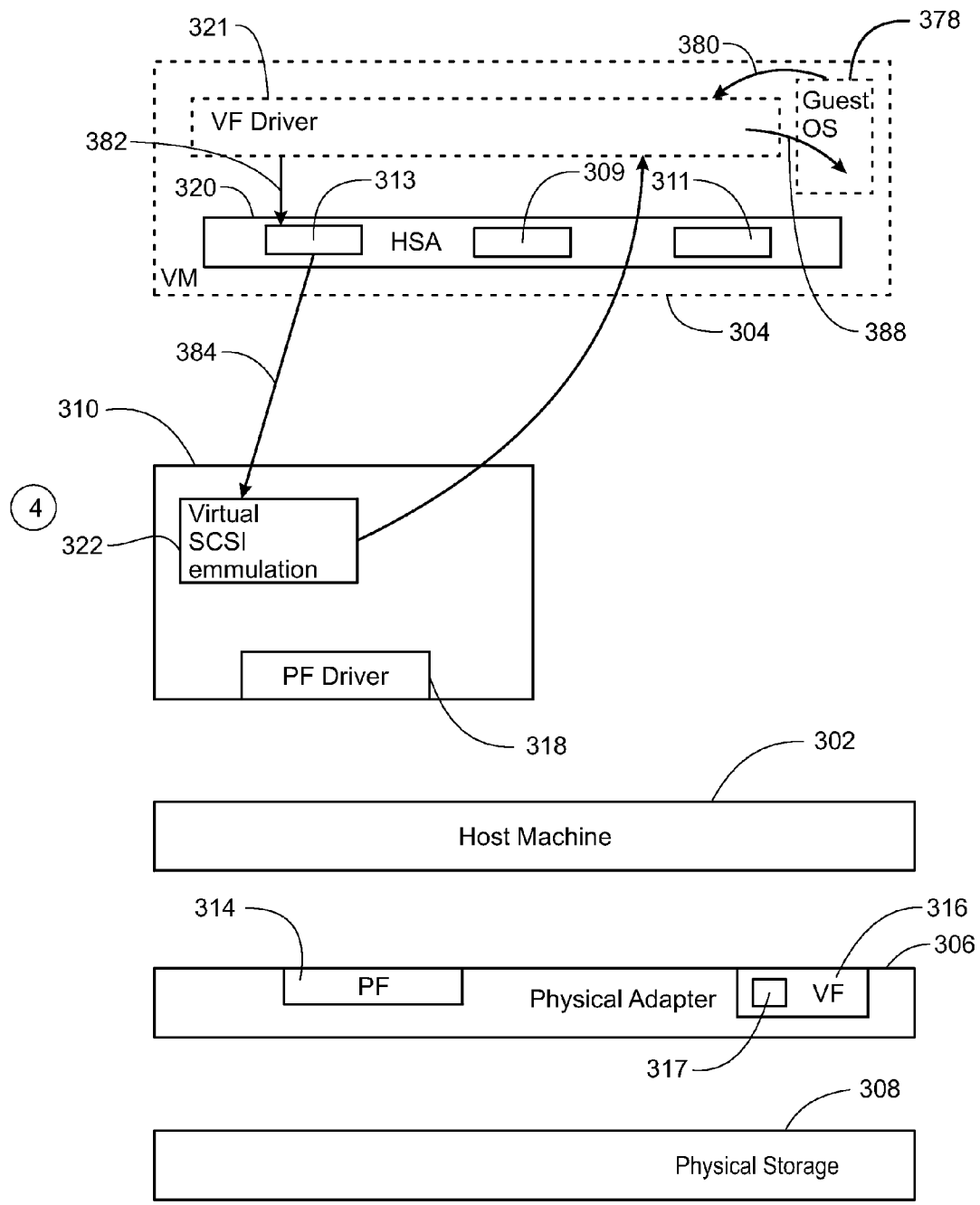

Referring to FIG. 4D, the instantiation of the virtual machine 304 also includes simulation of an actual "power on" event on the virtual hardware. In reaction to this event, the virtual machine's BIOS enters a boot sequence and starts up the guest operating system 307 of the given virtual machine 304. As indicated by arrow 380, the guest OS 307 probes its virtualized PCI bus and matches virtualized PCI devices with guest drivers registered as capable of managing these virtualized PCI devices. The VF driver 321 claims the hybrid storage adapter (HSA) 320.

The virtual SCSI initiator, which may be associated with one or more virtual SCSI targets, is located within the HSA 320. Virtual SCSI logical units (i.e. virtual disks) allocated to a given virtual machine 304 are identified using one or more different virtual SCSI LUNs associated with one or more such virtual SCSI targets.

As part of the initialization of its claimed device, that is the HSA 320, the VF driver 321 retrieves attributes from the HSA 320. The VF driver finds out about the first and second HSA PCI memory spaces 311, 313 via the HSA's emulated PCI configuration space 309. The VF driver 321 issues control messages to the HSA 320 to retrieve HSA specific attributes such as its virtual SCSI initiator address and all virtual SCSI targets accessible via that SCSI initiator. These messages are sent over the second HSA PCI memory space 313 as indicated by arrow 382, where they are trapped and emulated by the HSA 320 and forwarded to the virtualization intermediary 310 as indicated by arrow 384. The storage stack 328 of the virtualization intermediary 310 informs the VF driver 321 of the virtual SCSI targets associated with the VF 316 allocated to VM 304 as indicated in the mapping 317 as indicated by arrow 386. It will be appreciated that by using the virtual port bound to the VF 316, the storage stack 328 can access the same set of SCSI paths as can the VF 316.

As indicated by arrow 388, the VF driver 321 passes information concerning the existence of the discovered virtual SCSI targets to the higher level software within the guest operating system 307. A storage stack 379 of the guest operating system 307 probes the SCSI target for virtual SCSI LUNs of that SCSI target by sending SCSI commands via the second HSA memory space 313 to all possible SCSI logical units on all such virtual SCSI targets. The virtual SCSI LUNs correspond to the one or more virtual logical units (i.e. virtual disks) allocated to the virtual machine 304. The guest operating system of the virtual machine 304, therefore, has knowledge of the (virtual SCSI target, virtual SCSI LUN) address information that identify virtual SCSI logical units (i.e. virtual disks) allocated to the given new virtual machine 304.

Persons skilled in the art will appreciate that the use first mapping metadata 361 to map virtual SCSI logical units (i.e. virtual disks) to portions of physical SCSI logical units and the use of a second mapping metadata 363 to map virtual SCSI address two-tuple information (i.e. virtual SCSI target, virtual SCSI LUN) to virtual disks allocated to a given virtual machine 304 facilitates dynamic changes to the first mapping 361 to accommodate changing storage requirements of the a virtual disk identified by a given virtual SCSI address two-tuple.

IOV Access Operations

Figure 5:
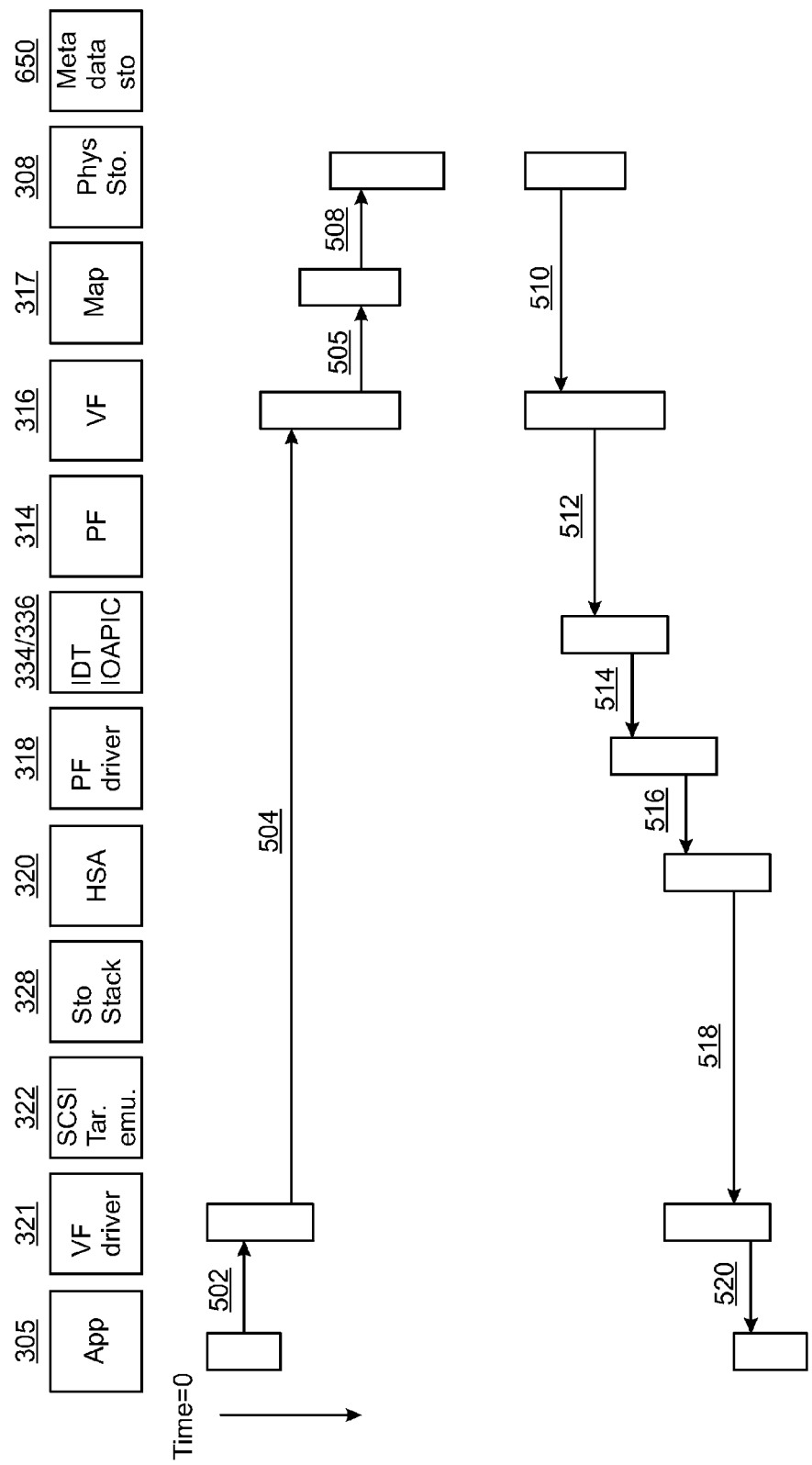
FIG. 5 is an illustrative transition diagram that illustrates process flow during a successful IOV Read/Write operation by the system of FIG. 3.
Figure 6:
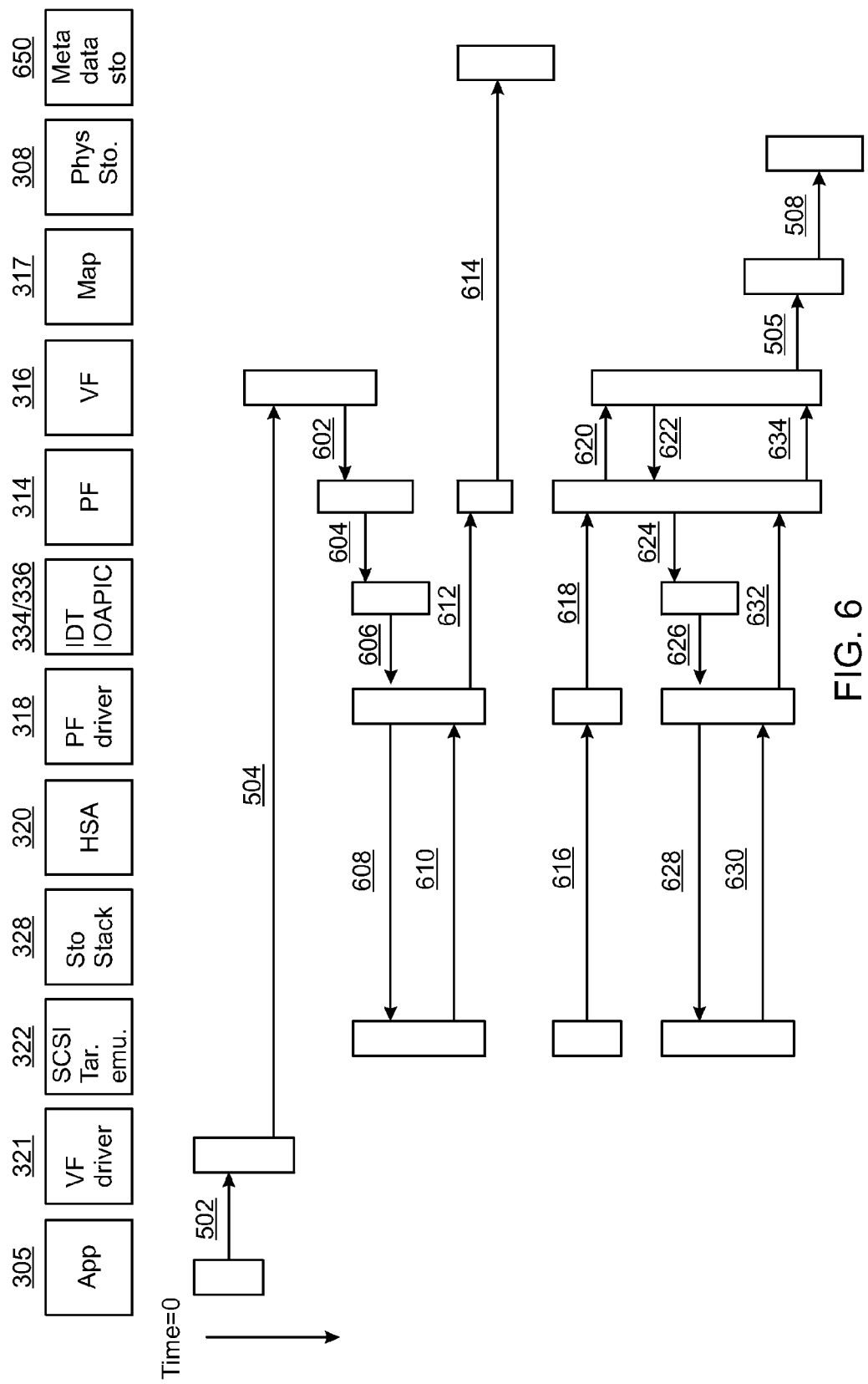
FIG. 6 is an illustrative transition diagram that illustrates process flow during an IOV Read/Write operation by the system of FIG. 3 in which an error is identified by a virtual function.

FIGS. 5-6 are illustrative transition diagrams to represent the operation of the system 300 of FIG. 3 and FIGS. 4A-4D. FIG. 5 is an illustrative transition diagram that illustrates process flow during a successful IOV Read/Write operation. FIG. 6 is an illustrative transition diagram that illustrates process flow during an IOV read operation in which an error is identified by a virtual function VF 316. Transitions shown within the FIGS. 5-6 that are identical are labeled with identical reference numerals. Errors, both recoverable and unrecoverable, may be discovered by the VF 316 or by a physical SCSI target in the course of an IOV operation.

The process of FIGS. 5-6 is performed using a virtual machine 304 and virtualization intermediary 310 and a VF 316 that interoperate with the host machine 302 and the adapter 306. Certain components in FIGS. 5-6 that correspond to the virtual machine 304 and the virtualization intermediary 310 and the VF 316 act to configure the host machine 302 or the physical adapter 306 according to machine readable program code stored in a machine readable storage device to perform specified functions of the components. The transition of FIGS. 5-6 represents different particular machines created in the course of a storage access operation.

In the following sections, it will be understood that the VF driver 321 acts as a "para-virtual" device that knows which commands to direct to the first HSA PCI memory space 311 and knows which commands to direct to the second HSA PCI memory space 313. For example, in the course of instantiation of the given virtual machine 304, which is described above with reference to FIGS. 4A-4C, the VF driver 321 directs SCSI control plane commands (i.e., non-Read/Write SCSI commands) to the second HSA PCI memory space 313. During runtime operation, the VF driver 321 directs only certain SCSI Read/Write commands to the first HSA memory space 311 and directs all other SCSI commands to the second HSA memory space 313.

During runtime, the HSA 320 in conjunction with the VF driver 321 directs certain SCSI commands, i.e. certain Read/Write SCSI commands, via the first HSA PCI memory space to the VF 316 for direct access to the host machine's storage adapter. In particular SCSI Read Commands and SCSI Write Commands with Command Data Blocks (CDBs), forms of IO access requests, having byte sizes of 6, 10, 12 or 16 are directed to the VF 316 via the first HSA PCI memory space 311 for direct access to the storage adapter. Other SCSI commands such as for configuration or discovery, etc., are directed via the second HSA PCI memory space 313 to the virtualization intermediary 310, which performs emulated processing. As a result, the SCSI target emulation located on the VF 316 can be simplified does not have to service non-read/write commands.

Furthermore, during normal runtime operation, it is the guest operating system 307 that determines which logical unit (i.e. virtual disk) is implicated by a given physical storage access request. It will be appreciated that during runtime, the VF driver 321 uses a unique combination comprising virtual SCSI initiator identifier and virtual SCSI target identifier to form SPI connections with the VF 316. A virtual port bound to the VF 416 serves as a transport address for the VF 316. The virtual port in combination with a physical port of a SCSI target and a physical SCSI LUN of the physical SCSI target act as a path between the VF 316 and physical storage 308.

The VF driver 321 must service SCSI task management operations in a manner which is savvy towards the existence of both HSA memory spaces. The VF driver must track to which memory space a SCSI command was dispatched in order to be able to abort this command if requested at a later time. Furthermore, SCSI bus, target, LUN reset task management operations must involve resetting both memory spaces successfully before the SCSI reset operation may be considered complete.

Successful IOV Access

Referring to both FIG. 3 and to the process 500 of FIG. 5, an application 305 running on the virtual machine 304 issues a Read/Write access request to the guest OS 307, represented by transition 502. The VF driver 321 assembles a virtual SCSI IO request. In some embodiments, the virtual SCSI IO request comprises a Virtual IO Dispatch Control Block containing amongst other information an embedded SCSI command data block (CDB) for the read/write operation and SCSI transport addresses identifying both the virtual SCSI target and the virtual SCSI logical unit being accessed. Through its virtual SCSI initiator, the VF driver 321 places the Block on a Virtual IO Block Request queue for access by the VF 316. The VF driver 321 notifies the VF 316 of the addition of the new Dispatch Control Block on the Virtual IO Block Request queue via the first HSA PCI memory space 311 as indicated by transition 504. The IO request is retrieved by the VF via DMA from the host memory and then is accessed and serviced by the VF 316.

Within the VF 316, an IOV mapping module 326 inspects the Virtual I/O Dispatch Control Block block to determine whether the Virtual IO Dispatch Control Block indicates an error condition. If the VF 316 finds no error condition (discussed below), then as indicated by transition 505, it maps the virtual SCSI target identifier information and the virtual SCSI logical unit identifier information in the Virtual I/O Dispatch Control Block to one or more regions of one or more physical SCSI targets and physical SCSI logical units in accordance with a mapping 317 forwarded from the SCSI target emulation module 322, which comprises the first metadata 361 and the second metadata 363. A single virtual SCSI logical unit (i.e. virtual disk) can be mapped to multiple different regions of physical storage.

Servicing an IO request by the VF 316 involves module 326 parsing its embedded SCSI CDB to retrieve the SCSI LBA and length fields. Next, module 326 accesses the logical extent map of the virtual SCSI logical unit to spawn a set of possibly multiple "child IOs" across a set of possibly multiple physical SCSI logical units where each physical SCSI logical unit may be accessible via a different physical SCSI target. Spawning each respective IO request involves allocating a respective Physical I/O Dispatch Control Block and SCSI CDB, initializing these data structures in accordance with the parameters of the virtual SCSI logical unit's logical extent map and the parameters of the SCSI CDB embedded within the Virtual IO Dispatch Control Block.

If the request involves a Read then information is retrieved from physical storage 308. If the IO request involves a write, then information is written to physical storage 308. Subsequently, after the IO request (Read or Write) has been successfully performed, the VF 316 through its virtual target places an IOV Completion Control Block on an IOV completion control block queue 331 for access by the VF driver 321. The VF 316 notifies the VF driver 321 of the addition of the new Completion Control Block on the Virtual IO Block Reply queue via an interrupt. As mentioned above, in some embodiments, a virtual SCSI initiator within the VF driver 321 and the virtual SCSI target within the VF 316 employ SCSI Parallel Interface (SPI) transport protocol, which is not port based, in their communications with each other.

The format of the Virtual I/O Dispatch Control Block sent by the VF driver 321 is storage adapter vendor dependent and is expected to include information of the type set forth in Table 1. The SCSI initiator and SCSI target IDs are SCSI Parallel Interface transport addresses.

TABLE 1

(Virtual I/O Dispatch Control Block Issued by VF driver)

SCSI (R/W) Command
SCSI Virtual Initiator ID
SCSI Virtual Target ID
SCSI Virtual Logical Unit Number (LUN)
Serial Number (used to uniquely identify command for abort)
VM Physical Memory Addresses for Read/Write Data exchange with Physical Storage The VF 316 assembles and transmits to the storage region 308 a physical SCSI IO request. In some embodiments, the physical SCSI IO request comprises a Physical I/O Dispatch Control Block as indicated by transition 508 for each region of physical storage to be accessed. The Physical I/O Dispatch Control Block is storage adapter vendor dependent and is expected to include information of the type set forth in Table 2. The SCSI initiator and SCSI target IDs are SCSI transport address specific to the SCSI transport protocol being used.

TABLE 2

(Physical I/O Dispatch Control Block Issued by VF)

SCSI (R/W) Command
SCSI Physical Initiator ID
SCSI Physical Target ID
SCSI Physical Logical Unit Number (LUN)
Serial Number (used to uniquely identify command for abort)
VM Physical Memory Addresses for Read/Write Data exchange with Physical Storage Assuming for the sake of this example, that the Virtual IO Dispatch Control Block includes a 'Read' command, and that such command is successfully processed by the storage region 308, then the storage region responds by providing the requested data to the VF 316.

The provided data may comprise a plurality of data packets. A completion routing module 328 of the VF 316 receives the data packets from the storage region 308 and causes the received data to be sent to DMA logic 330 within the adapter 306. The DMA logic 330 cooperates with IO MMU logic 332 within the host machine 302, to read the data directly into host machine physical memory (not shown) that has been allocated to the virtual machine 304 running the application 302 that originally requested the data. The DMA logic 330 stores retrieved data in the host memory address space specified in the Physical IO Dispatch Control Block. As explained above, a single virtual logical unit (i.e. virtual disk) may correspond to multiple regions of physical storage, and therefore, a single Virtual I/O Dispatch Control Block can result in transmission of multiple Physical I/O Dispatch Control Blocks. The DMA logic 330 may employ a well known 'DMA scatter gather address' technique to assemble all of the retrieved data into the specified host address space. The DMA logic 330 and the IO MMU logic 332 may be implemented in firmware or hardware, for example.

It will be appreciated that newer host machines allow for IOV by providing isolation of VMs during DMA transfers from an external device (e.g. an IOV adapter) to host machine memory (not shown) and vice versa. More particularly, I/O MMU logic 332 provides mapping for DMA operations so as to isolate a VM's guest OS address space when providing direct assignment from such VM's guest OS to VF. The IO MMU logic 332 provides memory isolation for the DMA to/from physical pages assigned to each VM.

Continuing with the assumption that a successful retrieval of data ensues, the storage region (i.e. physical SCSI target) 308 sends SCSI status information embedded within the SCSI command reply, indicated by transition 510, to the virtual port of the VF 316 on the physical adapter 306 upon completion of a Physical I/O Dispatch Control Block. That is, the storage region 308 sends a completion message upon completion of the transmission of all data requested (in the case of a Read) or upon receipt of all data that has been transmitted (in the case of a Write access) for all individual Physical I/O Dispatch Control Blocks that were sent.

The SCSI command completion includes information indicative of whether the dispatched SCSI command completed successfully, and if the SCSI command did not complete successfully, the SCSI command completion includes information indicative of the nature of the error (or exception) that resulted in failure to properly complete. See, SBC-3, Revision 15, Section 4.14 Error Reporting, As used herein, the term 'error' encompasses exceptions.

It is the responsibility of the VF's Completion Routing component 328 to both wait for all outstanding physical SCSI commands to physical storage spawned for a given virtual SCSI command to a virtual SCSI logical unit to complete before actually completing the virtual SCSI command to the virtual SCSI logical unit and to inspect the completion message for each physical SCSI command to physical storage to determine whether any of the physical completions contain indication of an error or of a recoverable error condition.

Assuming in this example that the module 328 determines that all of the spawned physical SCSI commands to physical storage have completed and finds no error or exception with any of the completing physical SCSI commands to physical storage, then the VF 316 queues the completion control block to the VF's reply queue indicating the SCSI status and SCSI sense codes for the completed command. The VF 316 issues an MSI or MSI-X interrupt using the MSI or MSI-X interrupt vector allocated and bound to the VF when the VF was instantiated, indicated by transition 512. The MSI or MSI-X interrupt is fielded by the host system's IO Advanced Programmable Interrupt Controller (IOAPIC) 334. The IOAPIC directs the interrupt to the host system's Interrupt Descriptor Table (IDT) of a particular physical processor of the host system. The IDT/IOAPIC directs the interrupt to the PF driver 318, as indicated by transition 514, which realizes that the physical interrupt was issued by the VF 316 by detecting the MSI/MSI-X interrupt vector over which the interrupt was received. The PF driver 318, in turn, informs the HSA 320 of the interrupt, as indicated by transition 516. The HSA 320 sends a virtual interrupt to the VF driver, as indicated by transition 518, which registered a virtual interrupt service routine (ISR) to indicate successful completion of the Physical I/O Dispatch Control Block. The VF driver 318 informs the requesting application 305 as indicated by transition 520. The VM 304, through the VF driver 321, for example, performs completion processing, which may involve processes such as de-queuing stored IO structures, providing access to Read data on memory pages allocated to an IO request by upper software layers, releasing IO structures and releasing memory pages, for example.

Virtual interrupts may be coalesced in accordance as described in commonly assigned U.S. patent application Ser. No. 12/687,999 (now U.S. Pat. No. 8,291,135 B2), invented by H. Subramanian, et al., entitled, Guest/Hypervisor Interrupt Coalescing for Storage Adapter Virtual Function in Guest Passthrough Mode, filed on Jan. 15, 2010, which is expressly incorporated herein by this reference.

One reason for routing the physical interrupt to a virtual interrupt within the virtualization layer 310 is the absence of host hardware resources to reliably provide interrupt isolation between multiple virtual machines fielding interrupts which would allow a physical interrupt generated by a VF 316 to be directly handled by an interrupt service routine previously registered by a VM in a virtualized instance of IDT allocated to that VM to be invoked by the host system's IOAPIC. With sufficient hardware support, a physical interrupt could be sent directly to the VF driver 321 to report the completion.

IOV Access with Recoverable Error Condition Identified by VF that can be Corrected by the Virtualization Intermediary FIG. 6 is an illustrative transition diagram that illustrates process flow during an IOV Read/Write operation by the system of FIG. 3 in which an error is identified by a virtual function. Transitions shown within FIG. 6 that are identical to transitions described with reference to FIG. 5 are labeled with identical reference numerals and are not further described. An example of a recoverable error condition that may be discovered by the VF 316 is an attempted access to an unallocated portion of a virtual SCSI logical unit (i.e. virtual disk), which may arise due to dynamic provisioning of a virtual SCSI logical unit allocated to the virtual machine seeking such access. Persons skilled in the art will understand that one approach to sharing storage resources among multiple virtual machines involves provisioning a virtual SCSI logical unit with only a small amount of the physical storage that actually has been allocated, with the intent of allocating additional portions of the virtual SCSI logical unit later when there is an actual request for write access within an unallocated portion of the virtual SCSI logical unit.

A SCSI target's logical extent map 317 communicated to the VF 316 indicates which portions of a virtual disk are allocated and which are unallocated. Basically, a gap in the logical sequence of the virtual disk corresponds to an unallocated region of virtual storage. Thus the VF 316 can recognize when a SCSI CDB contains a SCSI LBA and length field which refers to any portion of an unallocated region of a virtual SCSI logical unit. The VF 316 generates an error condition, which in the case of a request for unallocated portion of a virtual logical unit (i.e. virtual disk), is an example of a recoverable error condition.

Upon the VF's discovery of a reference to an unallocated region of a virtual disk for an Virtual I/O Dispatch Control Block, the VF 316 queues the Block thereby suspending the Virtual I/O Dispatch Control Block and communicates the error condition to the PF 314 via the interconnect circuitry 324, indicated by transition 602. The PF 314 creates an IO Exception Control Block, which it adds to the PF's IO completion control block queue 342. The PF 314 generates a new unsolicited MSI/MSI-X interrupt represented by transition 604, to the IDT/IOAPIC X34. An exception control block ordinarily includes (1) an indication of which VF incurred the exception, (2) the virtual SCSI target id, (3) the virtual SCSI LUN, and a list of one or more regions within the virtual SCSI logical unit (LBA and block length pairs) which need allocation. The invocation of the interrupt service routine is represented by transition 606. This interrupt may utilize the same MSI/MSI-X vector utilized for notifying the PF driver 318 of IO completions for SCSI commands previously submitted by the PF driver or it may be a separate MSI/MSI-X vector dedicated for this purpose. If the former, the PF driver 318 should be capable of distinguishing between IO completion control blocks for previously dispatched SCSI commands and an IO exception control block.

In response to the interrupt, the PF driver 318 de-queues the aforementioned IO Exception Control Block from the PF IO completion queue 342, inspects the Block to determine whether it is for a VF exception condition and forwards the exception condition to the virtual SCSI target emulation control plane 322—which had previously registered a callback routine with the PF driver 318 for this exact usage. The invocation of such routine in the virtual SCSI target emulation control plane 322 is represented by transition 608. The SCSI target emulation control plane 322 responds to the reference to unallocated region of logical extent recoverable error condition by searching for sufficient available storage to satisfy the IO request in the file system from which the affected virtual disk was originally allocated. The affected virtual disk is found from consulting the 2nd level mapping data—that is, VF #, virtual SCSI target ID, and virtual SCSI LUN. The SCSI target emulation control plane 322 also causes a modification of the file system's first mapping metadata 361 for the virtual disk file to reflect the allocation of the storage as requested in the IO Exception Control Block to that particular virtual disk file.

The PF 314 communicates the modified virtual SCSI logical unit logical extent map to first mapping metadata persistent storage 650 which is part of persistent storage, via PF driver 318 and PF 314 as indicated by transitions 610, 612 and 614. Accordingly, the metadata storage 650 updates the block allocation map of the file system containing the affected virtual disk file. Once the modifications to the file system's metadata are on persistent storage, updated contents of the mapping 317 provided by the virtual SCSI logical unit are communicated by the SCSI target emulation 322 to the PF driver 318, as indicated by transition 616, which in turn, communicates the new mapping information to the PF 314, as indicated by transition 618. In transition 620, the PF 314 communicates the new mapping via the interconnect circuitry 324 to the VF 316.

Before the VF 316 resumes processing of the suspended Virtual I/O Dispatch Control Block from the dispatch queue, it informs the SCSI virtual target emulation 322 of the successful receipt of the new map information and awaits receipt of a resume instruction. In respective transitions 622-626, IO completion information originating with the VF 316 passes from the VF to the PF (transition 622). The PF driver sends an interrupt message to the IDT/IOAPIC (transition 624), which in turn invokes an interrupt service routine of the PF driver 318 (transition 626). The PF driver invokes an IO completion callback registered by the SCSI target emulation control plane 322 (transition 628).

In respective transitions 630-632, a resume IO control message is passed from the SCSI virtual target emulation 322 to the PF driver 318 and from the PF driver to the PF 314 and from the PF to the VF 316 via the interconnect circuitry 324. As indicated by transitions 505 and 508, the VF uses the newly modified SCSI virtual target emulation mapping that it has received to map (transition 505) the Virtual I/O Dispatch Control Block to one or more Physical I/O Dispatch Control Block s and transmits (transition 508) the latter Blocks to the storage region 308. The storage region 308 responds to the one or more Physical I/O Dispatch Control Blocks.

Following the reception of responses for all Physical I/O Dispatch Control Blocks by 328, the completion is processed according to transitions 510-520 described in FIG. 5.

IOV Access with Non-Recoverable Error Condition Identified by VF that Cannot be Corrected by the Virtualization Intermediary Referring to FIG. 5, at transition 504 the VF 316 may discover an error that cannot be corrected. For example, the VF driver 321 may refer to a virtual SCSI target that does not exist. That is, a virtual SCSI target or virtual SCSI logical unit referred to in a Virtual I/O Dispatch Control Block has not yet been or may never be instantiated within the virtual target emulation mapping on the VF 316. Upon discovery of an uncorrectable error, then the VF may simply not respond to the I/O—as should be the case for the non-existent SCSI target use case. Alternatively, as should be the case for the non-existent/non-mapped SCSI LUN use case, the VF may form an IO Completion Control Block with the appropriate SCSI status and SCSI sense data filled in according to SBC-3, Revision 15, Section 4.14 and SPC-3, Revision 23, queues the control block to the VF completion queue, and generates an interrupt using the VF's MSI/MSI-X vector.

IOV Access with Error Condition Identified by Storage

Referring to FIG. 5, at transition 510 a physical SCSI target within storage 308 may report an unrecoverable error such as a physical SCSI LUN that has not been mapped to a physical SCSI logical unit or a SCSI medium error. In the case of an unrecoverable error, the VF 316 creates an IO Completion Control Block and reports the error to the VF driver 321. In the case of recoverable error such as a SCSI check condition or a SCSI reservation conflict error, the VF 316 reports the error to the virtualization intermediary via the PF 314 and the PF driver 318. The virtualization intermediary 310 may take steps to resolve the error and communicate a resolution to the VF 316 via the PF driver 318 and the PF 314 or may ignore the error and instruct the VF 316 to 'resume'—that is, to continue to return an uncorrectable error to the VF driver via an IO Completion Control Block—for example.

SCSI Target Reference Model

As described above, a collaborative SCSI target emulation in accordance with some embodiments is provided, which resides across both a PCIe SR-IOV virtual function and a virtualization intermediary. In accordance with some embodiments, the emulated SCSI targets are accessible only via SCSI initiator devices residing in virtual machines and managed by virtualization savvy para-virtualized virtual function drivers. In other words, virtual SCSI targets are accessed only by virtual SCSI initiator embedded within the HSA 320, not by physical SCSI initiators. The VF driver acquires virtual SCSI initiator information from the HSA 320 and submits this information through the HSA 2nd PCI memory space.

Moreover, in accordance with some embodiments, there are limits upon the scope of a virtual SCSI initiator. While a single VF may house multiple virtual SCSI target devices, each of these virtual SCSI target devices may be accessed by only a single virtual SCSI initiator device. Each virtual SCSI initiator device may of course access multiple virtual SCSI targets co-located in the same VF. Any given SCSI logical unit is accessible only via a single VF SCSI target device. Recall that a virtual SCSI initiator is used for communication between a VM and a VF and not for communication by the VF with a physical SAN over a physical network, for example.

A VF's SCSI target device does not support the "head of queue" and "ordered" SCSI Tagged Command Queuing modes since these commands are not required by the reference model herein. Moreover, SCSI Reserve/Release commands and SCSI Persistent Group Reservations (PGR) are neither supported, nor needed for a SCSI target accessed by but a single SCSI initiator. It will be appreciated that SCSI Reserve/Release commands, which are used to reserve and release logical units and the PGR commands, are required when there are multiple possible initiators or where a logical unit is available to multiple targets. However, since the reference model herein is limited to allowing only one virtual SCSI initiator to access a virtual SCSI logical unit through one virtual SCSI target, there is no need for either the Reserve/Release or PGR commands.

As explained above, in some embodiments, a VF's SCSI target service only 6-, 10-, 12-, and 16-byte SCSI read and write commands. In addition, the VF's SCSI target will service SCSI task abort and SCSI (bus, target, LUN) reset task management requests. SCSI task management is supported via the use of a typed task management Virtual Task Management Control Block Request similar to the Virtual I/O Dispatch Control Block Request.

The VF's SCSI target service supports aborting a SCSI command previously dispatched to it. A SCSI task—that is, a single SCSI read or write command since linked/tagged SCSI commands are not supported—directed to a VF SCSI target can be aborted by queuing a Virtual Task Management Control Block to the Virtual IO Block Request queue of the VF. Note that there is one Virtual IO Request (and Reply) Queue per VF not one per SCSI target device per VF. The task management control block type must be set to indicate a task abort and the control block must indicate a storage adapter dependent sequence number used to uniquely identify the Virtual IO Dispatch Control Block of the SCSI task to abort which was previously queued to the Virtual IO Block Request queue of the same VF. All outstanding—that is, ones which have not yet been completed—virtual SCSI commands/tasks must be tracked. Furthermore, the tracking mechanism must identify a way to uniquely identify each of the possibly multiple physical SCSI commands which were spawned as a result of servicing the virtual SCSI command to be aborted. Servicing the task abort of a virtual SCSI command must involve successfully aborting each of the physical SCSI commands resulting from servicing the single virtual SCSI command. The abort task request can be completed only after each of these aborted physical SCSI commands has completed and the aborted virtual SCSI command has been completed with a SCSI TASK ABORTED status.

SCSI bus reset, target reset, and LUN reset are three classes of reset task management operations that are serviced by mapping these to the appropriate set of SCSI task abort operations. A reset ultimately is mapped to an abort. Each virtual SCSI bus consists of but a single SCSI initiator and a single SCSI target. Therefore, a SCSI bus reset is mapped to resetting a single SCSI target. A SCSI target may manage multiple logical units. Therefore, a SCSI target reset is mapped to resetting each of the logical units managed by that SCSI target. Each SCSI logical unit may support multiple outstanding SCSI commands/tasks. Therefore, a SCSI LUN reset is mapped to aborting each outstanding SCSI command/task for the SCSI logical unit mapped to that SCSI LUN for the specified SCSI target.

As shown above in Tables 1 and 2, each SCSI command includes a unique command identifier so that a virtual SCSI target on a VF can distinguish one command from another on the same virtual SCSI logical unit on the same virtual SCSI target so as to distinguish which virtual command to abort, for example. It is possible that there may be a desire to abort just one virtual SCSI command out of perhaps thousands of virtual SCSI commands.

While Auto Contingent Allegiance (ACA) conditions are not supported by a VF's virtual SCSI target device, coherent servicing of SCSI unit attention check conditions requires consistent awareness of the existence of a SCSI unit attention check condition and the specific SCSI sense data associated with it across both the SCSI target emulation module 322 in the virtualization intermediary and the SCSI target emulation residing in the VF 316. Whenever a SCSI logical unit either enters into or exits from a unit attention state, it is necessary that both components of the collaborative SCSI target emulation be aware of the change in unit attention state for the SCSI logical unit. A mechanism is provided to alert the virtualization intermediary whenever the VF's SCSI target device discovers a SCSI unit attention condition for any of the SCSI logical units it manages. Mechanisms to share a SCSI logical unit's unit attention state across the virtualization intermediary and the VF's SCSI target device are also required when (1) the virtualization intermediary discovers that a logical unit enters a unit attention state and (2) whenever a logical unit transitions out of a unit attention condition.

Tracking SCSI Commands Through Multiple Levels

SCSI command tracking to associate a virtual SCSI command with multiple physical SCSI commands spawned by such virtual SCSI command is a well known problem. For example, a virtual SCSI command may seek access to information that is disposed across different physical SCSI logical units of two different SCSI physical targets. In that case, an individual physical SCSI command may be spawned from a single virtual SCSI command for each of the two different physical SCSI targets. A completion for the virtual SCSI command is not generated until all physical SCSI commands produced in response to such virtual SCSI command have completed. SCSI command tracking has been used in the past to determine when all physical SCSI commands spawned by such a virtual SCSI command have completed.

Tracking also is used in some embodiments for resets and to abort SCSI commands. For instance, it is well known that when a virtual SCSI command fails to complete within a timeout period, then all outstanding physical SCSI commands spawned by that virtual SCSI command are aborted. The failure to complete may be due to a a failed connection between a storage adapter and a physical SCSI initiator or due to a transport failure with the physical SCSI target, for example. Assuming that these aborts occur successfully, the virtual SCSI command may be retransmitted resulting once again in the spawning of multiple physical SCSI commands. Typically, if an abort of one or more physical SCSI commands fails, then the physical SCSI logical unit associated with the physical SCSI command is reset. Ordinarily, if the SCSI logical unit reset succeeds, then the virtual SCSI command may be retransmitted, or an error may be reported to an application that generated the SCSI command, for example. If on the other hand the SCSI logical unit reset fails, then a SCSI physical target associated with the physical SCSI logical unit is reset, for example.

Figure 7:
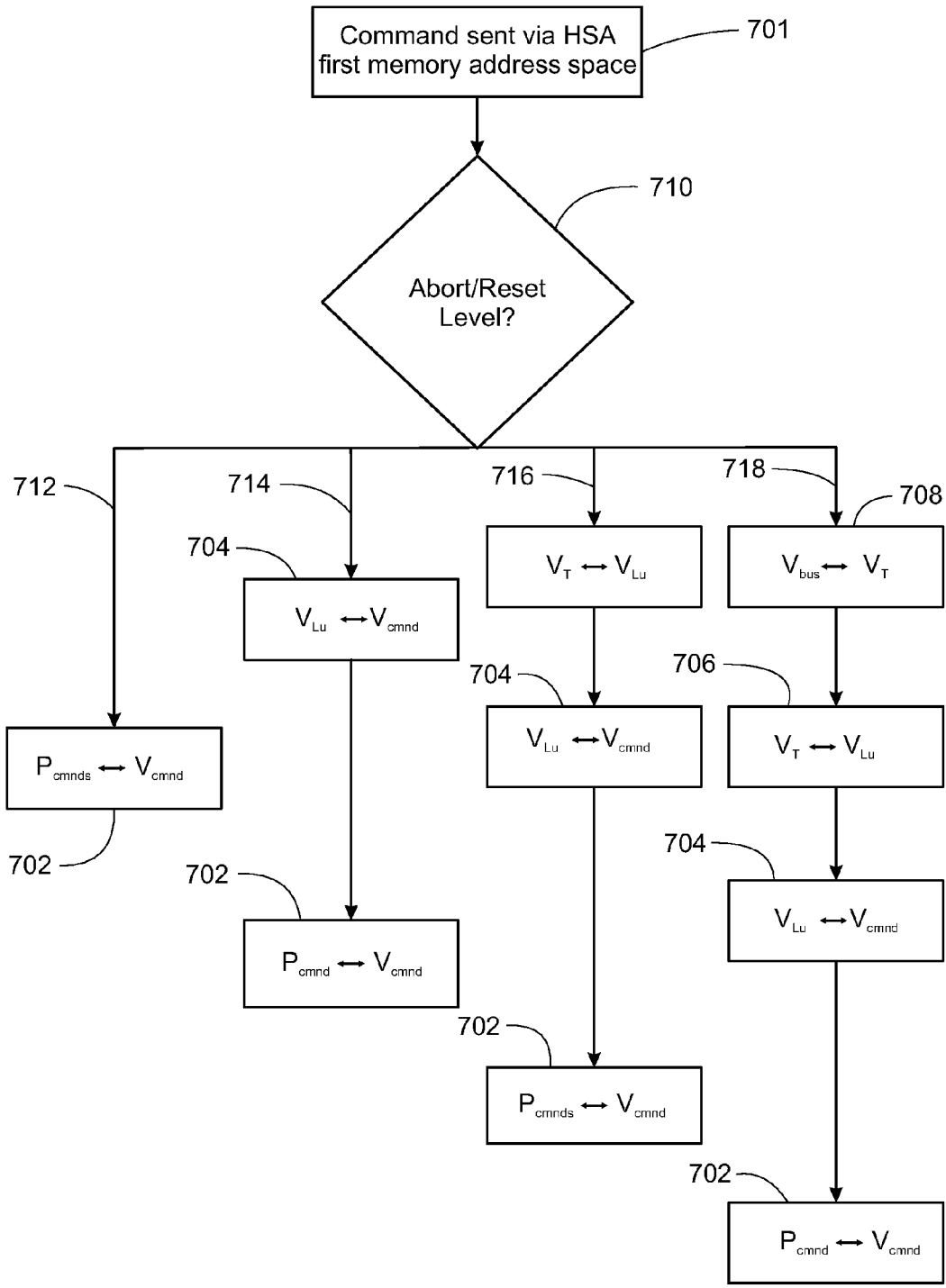
FIG. 7 is an illustrative drawing of the mapping process run within a VF to track physical SCSI commands associated with a virtual SCSI command for completion processing and for processing SCSI command aborts and SCSI LUN, target, and bus reset task management operations.

FIG. 7 is an illustrative drawing of mapping process 700 run within the VF 316 to track physical SCSI commands associated with a virtual SCSI command for completion processing and for processing aborts and resets in accordance with some embodiments of the invention. Adapter resources 339, which include processing resources and memory device resources, are configured to act as a particular machine to implement the mapping process 700. The mapping process 700 involves use of a first level mapping 702 between a given virtual SCSI command and all physical SCSI commands spawned by such virtual SCSI command. The mapping process 700 involves use of a second level mapping 704 between a given virtual SCSI logical unit and all virtual SCSI commands associated with the virtual SCSI logical unit. The mapping process 700 involves use of a third level mapping 706 between a virtual SCSI target and all virtual SCSI logical units managed by the virtual SCSI target. The mapping process 700 involves use of a fourth level mapping 708 between the virtual SCSI target and a virtual SCSI bus. As explained above, however, the HSA 320 has only a single virtual SCSI initiator, and thus one virtual SCSI bus.

The mappings 702-708 may comprise mapping structures such as tables that are disposed a memory space associated with the VF 316. Note that in FIG. 7, multiple instances of the mappings 702-708 are shown. A first level mapping 702 is created on the VF 316 when a physical SCSI command is spawned from a virtual SCSI command. For example if a given virtual SCSI command spawns five physical SCSI commands then five unique serial numbers are produced for the five new physical SCSI commands, and the first level mapping 702 uses those serial numbers to map the physical SCSI commands to the virtual SCSI command that spawned them. The first mapping 702 for a given virtual SCSI command is deleted upon completion of the virtual SCSI command (i.e. upon completion of all physical SCSI commands spawned by it.) A second level mapping 704 is created on the VF 316 when a virtual command is issued for a given virtual SCSI logical unit. The second mapping 704 maps the virtual SCSI command to a virtual SCSI logical unit. A third level mapping 706 is created on the VF 316 when a new logical unit is created. The third level mapping maps the virtual SCSI logical unit to a virtual SCSI target. As explained above the fourth level mapping 708 maps a single virtual SCSI target to a virtual SCSI initiator.

In decision block 710, a determination is made as to the level at which a mapping is required. The process of 700 begins when an abort or a reset command is sent in block 701 over the first memory space 311 of the HSA 320. When decision block 710 determines that a given virtual SCSI command is to be aborted, control flows to a first branch 712, which uses to uses a first level mapping 702 to identify physical SCSI commands associated with the virtual SCSI command to be aborted. Each physical command associated with the given virtual SCSI command is aborted.

When decision block 710 determines that a given virtual logical unit is to be reset, control flows to a second branch 714, which uses to uses a second level mapping 704 to identify each virtual SCSI command associated with the virtual SCSI logical unit to be reset. Next, for each identified virtual SCSI command, a first level mapping 702 is used to identify physical SCSI commands associated with the virtual SCSI command. Each physical SCSI command associated with an identified virtual SCSI command is aborted.

When decision block 710 determines that a given virtual target is to be reset, control flows to a third branch 716, which uses to uses a third level mapping 706 to identify each virtual SCSI logical unit associated with the virtual SCSI target to be reset. Next, for each identified virtual SCSI logical unit, a second level mapping 704 is used to identify each virtual SCSI command associated with the virtual SCSI logical unit. Following that, for each identified virtual SCSI command, a first level mapping 702 is used to identify each physical SCSI command associated with the virtual SCSI command. Each physical SCSI command associated with an identified virtual SCSI command is aborted.

When decision block 710 determines that a given virtual bus is to be reset, control flows to a fourth branch 718, and processing occurs in much the same way as the third branch 716 since there exists only one virtual SCSI target for the virtual SCSI initiator (bus).

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. A method for providing an emulated hybrid storage adapter (HSA) in a system that includes a host computing machine configured to implement a virtualization intermediary and that includes a physical storage adapter, a virtual machine (VM), and a virtual function (VF) of the physical storage adapter, the method comprising:
providing, for the HSA, a first HSA memory space that provides access from the VM directly to the VF of the physical storage adapter and a second HSA memory space that provides access from the VM to physical storage with virtualization intermediary intervention;
sending, by the HSA, a request to the virtualization intermediary to forward mapping information to the VF, the mapping information including a first mapping between virtual disks and physical regions of the physical storage and a second mapping between virtual disks and virtual disk addresses;
receiving a first JO operation from a VF driver of the VM directed to the first HSA memory space for direct access to the physical storage through the VF;
forwarding the first JO operation to the VF directly without virtual intermediary intervention, wherein the VF uses the mapping information to provide access to the physical storage;
receiving a second JO operation from the VF driver of the VM directed to the second HSA memory space for emulated access to the physical storage; and
forwarding the second JO operation to the virtual intermediary, wherein the virtual intermediary uses the mapping information to provide access to the physical storage.

2. The method of claim 1 further comprising:
providing configuration information for the first HSA memory space and the second HSA memory space to the VF driver to allow the VF driver to direct IO operations to the first HSA memory space and the second HSA memory space.

3. The method of claim 1, further comprising:
sending, by the HSA, a request for a creation of a virtual target for a virtual disk to the virtualization intermediary, wherein a mapping of the virtual target is forwarded by the virtualization intermediary to the VF.

4. The method of claim 3, wherein the second mapping includes a mapping comprising the virtual target and a virtual logical unit.

5. The method of claim 1, further comprising:
receiving a request from the VF driver of the VM at the second HSA memory space to identify virtual targets identified within the mapping information that are accessible by the VM; and
forwarding, by the HSA, the request to the virtualization intermediary, wherein the virtualization intermediary identifies to the VF driver the virtual targets that are accessible by the VM.

6. The method of claim 1, further comprising:
receiving a read IO operation or a write IO operation from the VF driver directed to the first HSA memory space; and
forwarding, by the HSA, the read IO operation or the write IO operation directly to the VF without virtual intermediary intervention.

7. The method of claim 1, further comprising:
receiving a non-read or write IO operation or from the VF driver directed to the second HSA memory space; and
forwarding, by the HSA, the non-read or write IO operation to the virtual intermediary, wherein the virtual intermediary uses the mapping information to provide access to the physical storage.

8. The method of claim 1, wherein read IO operations and write IO operations from a VF driver are directed to the first HSA memory space and non-read and write IO operations from the VF driver are directed to the second HSA memory space.

9. A non-transitory computer-readable storage medium containing instructions for providing an emulated hybrid storage adapter (HSA) in a system that includes a host computing machine configured to implement a virtualization intermediary and that includes a physical storage adapter, a virtual machine (VM), and a virtual function (VF) of the physical storage adapter, wherein the instructions, when executed, control a computer system to be configured for:
providing, for the HSA, a first HSA memory space that provides access from the VM directly to the VF of the physical storage adapter and a second HSA memory space that provides access from the VM to physical storage with virtualization intermediary intervention;
sending, by the HSA, a request to the virtualization intermediary to forward mapping information to the VF, the mapping information including a first mapping between virtual disks and physical regions of the physical storage and a second mapping between virtual disks and virtual disk addresses;
receiving a first IO operation from a VF driver of the VM directed to the first HSA memory space for direct access to the physical storage through the VF;
forwarding the first IO operation to the VF directly without virtual intermediary intervention, wherein the VF uses the mapping information to provide access to the physical storage;
receiving a second IO operation from the VF driver of the VM directed to the second HSA memory space for emulated access to the physical storage; and
forwarding the second IO operation to the virtual intermediary, wherein the virtual intermediary uses the mapping information to provide access to the physical storage.

10. The non-transitory computer-readable storage medium of claim 9, further configured for:
providing configuration information for the first HSA memory space and the second HSA memory space to the VF driver to allow the VF driver to direct IO operations to the first HSA memory space and the second HSA memory space.

11. The non-transitory computer-readable storage medium of claim 9, further configured for:
sending, by the HSA, a request for a creation of a virtual target for a virtual disk to the virtualization intermediary, wherein a mapping of the virtual target is forwarded by the virtualization intermediary to the VF.

12. The non-transitory computer-readable storage medium of claim 11, wherein the second mapping includes a mapping comprising the virtual target and a virtual logical unit.

13. The non-transitory computer-readable storage medium of claim 9, further configured for:

receiving a request from the VF driver of the VM at the second HSA memory space to identify virtual targets identified within the mapping information that are accessible by the VM; and forwarding, by the HSA, the request to the virtualization intermediary, wherein the virtualization intermediary identifies to the VF driver the virtual targets that are accessible by the VM.

14. The non-transitory computer-readable storage medium of claim 9, further configured for:

receiving a read JO operation or a write JO operation from the VF driver directed to the first HSA memory space; and forwarding, by the HSA, the read JO operation or the write JO operation directly to the VF without virtual intermediary intervention.

15. The non-transitory computer-readable storage medium of claim 9, further configured for:

receiving a non-read or write JO operation or from the VF driver directed to the second HSA memory space; and forwarding, by the HSA, the non-read or write JO operation to the virtual intermediary, wherein the virtual intermediary uses the mapping information to provide access to the physical storage.

16. The non-transitory computer-readable storage medium of claim 9, wherein read JO operations and write JO operations from a VF driver are directed to the first HSA memory space and non-read and write JO operations from the VF driver are directed to the second HSA memory space.

17. An apparatus for providing an emulated hybrid storage adapter (HSA) by implementing a virtualization intermediary and including a physical storage adapter, a virtual machine (VM), and a virtual function (VF) of the physical storage adapter, the apparatus comprising:

one or more computer processors; and a non-transitory computer-readable storage medium comprising instructions, that when executed, control the one or more computer processors to be configured for:

providing, for the HSA, a first HSA memory space that provides access from the VM directly to the VF of the physical storage adapter and a second HSA memory space that provides access from the VM to physical storage with virtualization intermediary intervention;

sending, by the HSA, a request to the virtualization intermediary to forward mapping information to the VF, the mapping information including a first mapping between virtual disks and physical regions of the physical storage and a second mapping between virtual disks and virtual disk addresses;

receiving a first IO operation from a VF driver of the VM directed to the first HSA memory space for direct access to the physical storage through the VF;

forwarding the first IO operation to the VF directly without virtual intermediary intervention, wherein the VF uses the mapping information to provide access to the physical storage;

receiving a second IO operation from the VF driver of the VM directed to the second HSA memory space for emulated access to the physical storage; and forwarding the second IO operation to the virtual intermediary, wherein the virtual intermediary uses the mapping information to provide access to the physical storage.

18. The apparatus of claim 17, further configured for:

providing configuration information for the first HSA memory space and the second HSA memory space to the VF driver to allow the VF driver to direct IO operations to the first HSA memory space and the second HSA memory space.

19. The apparatus of claim 17, further comprising:

sending, by the HSA, a request for a creation of a virtual target for a virtual disk to the virtualization intermediary, wherein a mapping of the virtual target is forwarded by the virtualization intermediary to the VF.

20. The apparatus of claim 17, further comprising:

receiving a request from the VF driver of the VM at the second HSA memory space to identify virtual targets identified within the mapping information that are accessible by the VM; and forwarding, by the HSA, the request to the virtualization intermediary, wherein the virtualization intermediary identifies to the VF driver the virtual targets that are accessible by the VM.

21. The apparatus of claim 17, wherein read IO operations and write IO operations from a VF driver are directed to the first HSA memory space and non-read and write IO operations from the VF driver are directed to the second HSA memory space.

* * * * *